(12) United States Patent
Nandan et al.

(10) Patent No.: US 10,937,089 B2
(45) Date of Patent: Mar. 2, 2021

(54) MACHINE LEARNING CLASSIFICATION AND PREDICTION SYSTEM

(71) Applicant: ACCENTURE GLOBAL SOLUTIONS LIMITED, Dublin (IE)

(72) Inventors: Priyank Nandan, London (GB); Gareth Cork, Woking (GB); Sherif Aurangzeb Saeed Choudhry, Ely (GB); Ali Yagmur Aydinli, London (GB); Andrew Hodge, Suffolk (GB); David James McGinty, Bangor (GB)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 134 days.

(21) Appl. No.: 16/024,253

(22) Filed: Jun. 29, 2018

(65) Prior Publication Data
US 2019/0180358 A1    Jun. 13, 2019

Related U.S. Application Data

(60) Provisional application No. 62/597,340, filed on Dec. 11, 2017.

(51) Int. Cl.
*G06Q 40/00* (2012.01)
*G06Q 20/10* (2012.01)
(Continued)

(52) U.S. Cl.
CPC ............. *G06Q 40/02* (2013.01); *G06K 9/623* (2013.01); *G06K 9/6219* (2013.01); *G06N 20/00* (2019.01)

(58) Field of Classification Search
CPC ................. G06Q 40/02; G06Q 40/00
(Continued)

(56) References Cited

U.S. PATENT DOCUMENTS

| 8,345,934 B2 | 1/2013 | Obrador et al. |
| 9,372,915 B2 | 6/2016 | Long et al. |

(Continued)

OTHER PUBLICATIONS

MacQueen, J., "Some methods for classification and analysis of multivariate observations", Proceedings of the Fifth Berkeley Symposium on Mathematical Statistics and Probability, vol. 1: Statistic, pp. 281-297, University of California Press, Berkeley, Calif. 1967.

*Primary Examiner* — Hai Tran
(74) *Attorney, Agent, or Firm* — Mannava & Kang, P.C.

(57) ABSTRACT

A machine learning and predictive analytics system is disclosed. The system may comprise a data access interface to receive, over a network, data associated with a subject from a data source. The data source may include an internal data source and an external data source. The system may comprise at least one processor to analyze the data associated with the subject, predict a future life event based on the analysis of the data, and calculate at least one of a financial forecast, a ratio, and an index based on the predicted future life event and data associated with the subject. The processor may use machine learning, statistical analysis, simulation, and/or modeling techniques to analyze the data, predict the future life event, and calculate the at least one of a financial forecast, a ratio, and an index, which may represent likelihood of the subject taking a financial action with a financial institution. The processor may also generate a recommendation for the subject to elect the financial action or other product or service based on the predicted life event.

15 Claims, 21 Drawing Sheets

(51) Int. Cl.
*G06Q 40/02* (2012.01)
*G06K 9/62* (2006.01)
*G06N 20/00* (2019.01)

(58) Field of Classification Search
USPC .......................................................... 705/35
See application file for complete search history.

(56) References Cited

U.S. PATENT DOCUMENTS

| | | | | |
|---|---|---|---|---|
| 2009/0276368 | A1* | 11/2009 | Martin | G06Q 40/02 705/36 R |
| 2014/0330691 | A1* | 11/2014 | Samano Palacios | G06Q 40/00 705/35 |
| 2017/0236215 | A1* | 8/2017 | Eisen | G06Q 50/01 705/35 |

* cited by examiner

MACHINE LEARNING CORE & PREDICTIVE ANALYTICS SYSTEM 300

400

INPUTS

1) DATA

Collates data inputs from financial and social sources (DS2S).

Data inputs include:
- Job
- Married
- Children
- Income
- Debt
- Social likes
- Location
- Discretionary expenses
- Mandatory expenses
- (plus many more)

2) CLUSTER

Cluster customers into similar groups prior to machine learning.

Data inputs include:
- Anonymised clusters i.e. Experian etc.
- Bank data from step 1 and machine learnt sub-segments / clusters

3) LIFE EVENT PREDICTORS

Machine learning core to predict: probability distribution of timing of life events and probability distribution of financial impact. Each event would require a multiple separate model.

Major life events:
- Buying house
- Having a baby
- Getting married
- Kids starting school
- Retirement etc.

Ongoing life event:
- Minor income changes
- Promotion income impacts
- Changes in mandatory expenditure
- Changes in discretionary expenditure etc.

Predict:
1) Estimated date,
2) Probability of occurrence,
3) Predict value / % change

4) FORECASTING

Evaluates the impact of life events on financial metrics utilising Monte Carlo simulation for stress testing.

Computation steps
1. Utilise probability distributions from step 3 to forecast ahead the financial health of a customer
2. Repeat multiple (1000x) times
3. Evaluate edge cases for stress testing

5) RATIOS

Value the customer and compute ratios over time horizon.

Ratios / Measures
1. Net Assets
2. Disposable Income
3. Interest Coverage
4. Current Ratio
5. Luxury / Mandatory spending
6. LTV
7. etc.

OUTPUTS

6A) INDEX

Produces wellbeing index

Weighted sum of relevant financial metrics.

6B) REC.

Produces actionable customer insights

Ratios compared to pre-set criteria, triggering recommendations

MODELS:
- Bayesian Hierarchical Clustering or
- K-means clustering
- Monte Carlo and using inhouse financial model

FIG. 4

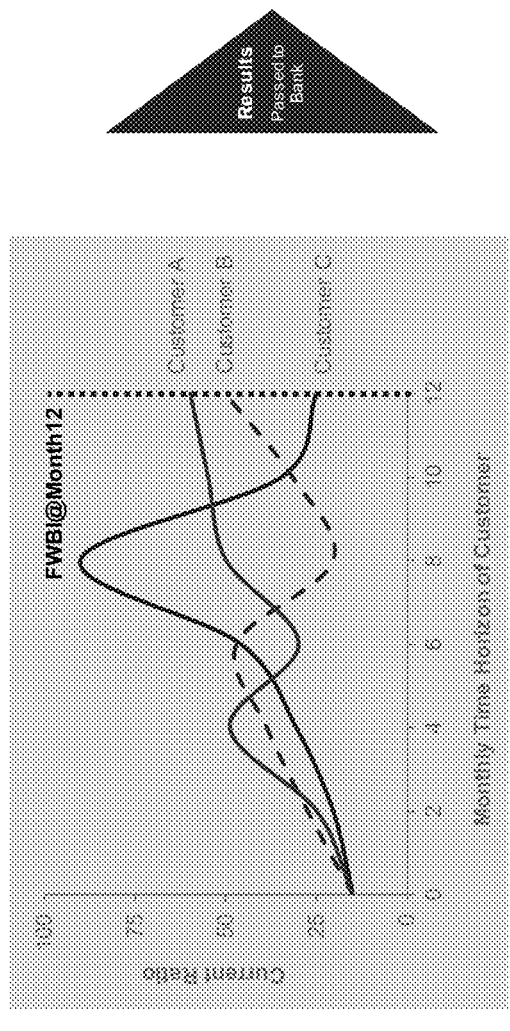

Calculate Ratios
1. Liabilities / Assets
2. Disposable Income / Net Assets
3. Interest Coverage
4. Asset Coverage
5. Net Cash Flow / Debt
6. Due Liabilities / Cash available
7. Luxury / Total Spending
8. Income stability
9. Total Savings / Expenditure
10. Total Savings / Net Assets
11. Total Pension / Net Assets
12. Property Value / Net Assets
13. etc.

FWBI@M12 =
$w_1$ * Liabilities / Assets
+$w_2$ * Disposable Income
+$w_3$ * Interest Coverage
+$w_4$ * Income Stability
+$w_5$ * Luxury / Total Spending
+ ...
(inc. Confidence Interval)

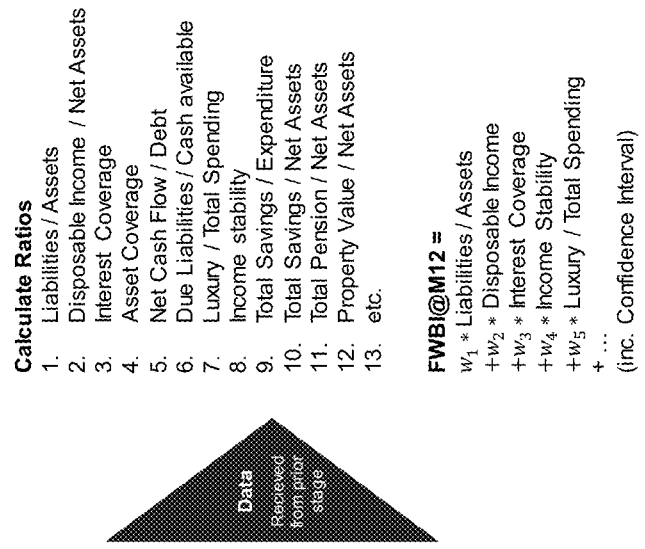

FIG. 11

Main Dashboard
Home

Search

Today's Tasks

- Review new customers insights generated for: Mark Chan [View Profile]
- Review new customers insights generated for: Alice Brown [View Profile]

Upcoming events

There are no upcoming events in you calendar

My Open Leads-This Week

| Name | Channel | EMAIL | PHONE | LEAD STATUS |
| --- | --- | --- | --- | --- |
| Caleb Pittman | Online | kellie_langosh@gutmann.name | 825-585-6515 | Not Contacted |
| Harvwy Aguilar | Online | gianni.jakabowski@yahoo.com | 222-096-6440 | Not Contacted |
| Lettie Bates | Branch | marvin.denesik@champlin.net | 180-266-0504 | Not Contacted |
| Keven Diaz | Mobil | russell.albin@cristina.name | 817-381-0406 | Not Contacted |
| Bettie Dunkan | Mobil | irma_abernathy@lauren.us | 745-669-0817 | Not Contacted |
| Hattie Barrett | Mobil | iva_vonrueden@gmail.com | 290-513-3792 | Not Contacted |

Fig. 13A

MACHINE LEARNING CLASSIFICATION AND PREDICTION SYSTEM

PRIORITY

This patent application claims priority to U.S. Provisional Patent Application 62/597,340, entitled "Machine Learning Classification and Prediction," filed on Dec. 11, 2017.

TECHNICAL FIELD

This patent application relates generally to artificial intelligence type computers and digital data processing systems and corresponding data processing methods and products for emulation of intelligence. The embodiments include supervised machine learning classification and predictive analytics.

BACKGROUND

Machine learning evolved from the study of pattern recognition and computational learning theory in artificial intelligence. Machine learning explores the study and construction of algorithms that can learn from and make predictions on data. Operations are achieved by building a machine-implemented model from example inputs in order to make data-driven predictions or decisions rather than following strictly static program instructions.

One type of machine learning involves supervised learning based on a training set as part of a classification process. Examples of machine learning algorithms used for classification include the well-known Naïve Bayes and C4.5 algorithms, or a so-called "stacked" combination of two or more such algorithms. The machine learning algorithm examines the input training set, and the computer "learns" or generates a classifier, which is able to classify a new document or another data object under one or more categories. In other words, the machine learns to predict whether a document or another type of data object, usually provided in the form of a vector of predetermined attributes describing the document or data object, belongs to a category. When a classifier is being trained, classifier parameters for classifying objects are determined by examining data objects in the training set that have been assigned labels indicating to which category each object belongs in the training set. After the classifier is trained, the classifier's goal is to predict to which category an object provided to the classifier for classification belongs.

A technical problem associated with machine learning, and in particular with classifiers, is that, in practice, the classifiers that assign objects to categories make mistakes. For example, classifiers may generate false positives, i.e., instances of mistakenly assigning an object to a category, and false negatives, i.e., instances of mistakenly failing to assign an object to a category when the object belongs in the category. These mistakes are often caused by a number of factors, including deficiencies of the training set. For example, typically, the larger the training set, the better the classification accuracy. However, large training sets may be unavailable. And if they are available, these data sets may be clustered and anonymized data, which may lead to other challenges in usage and processing. These and other technical problems may result in machine learning inaccuracies and decreased predictive efficiency and reliability.

BRIEF DESCRIPTION OF DRAWINGS

Features of the present disclosure are illustrated by way of examples shown in the following figures. In the following figures, like numerals indicate like elements, in which:

FIGS. 3-4 illustrate a predictive analytics system, according to an example;

FIG. 11 illustrates ratio calculation and indexing analytics, according to an example;

FIGS. 13A-13C illustrate various screens of a dashboard for life event prediction based on machine learning and predictive analytics, according to an example.

DETAILED DESCRIPTION

Figure 1:
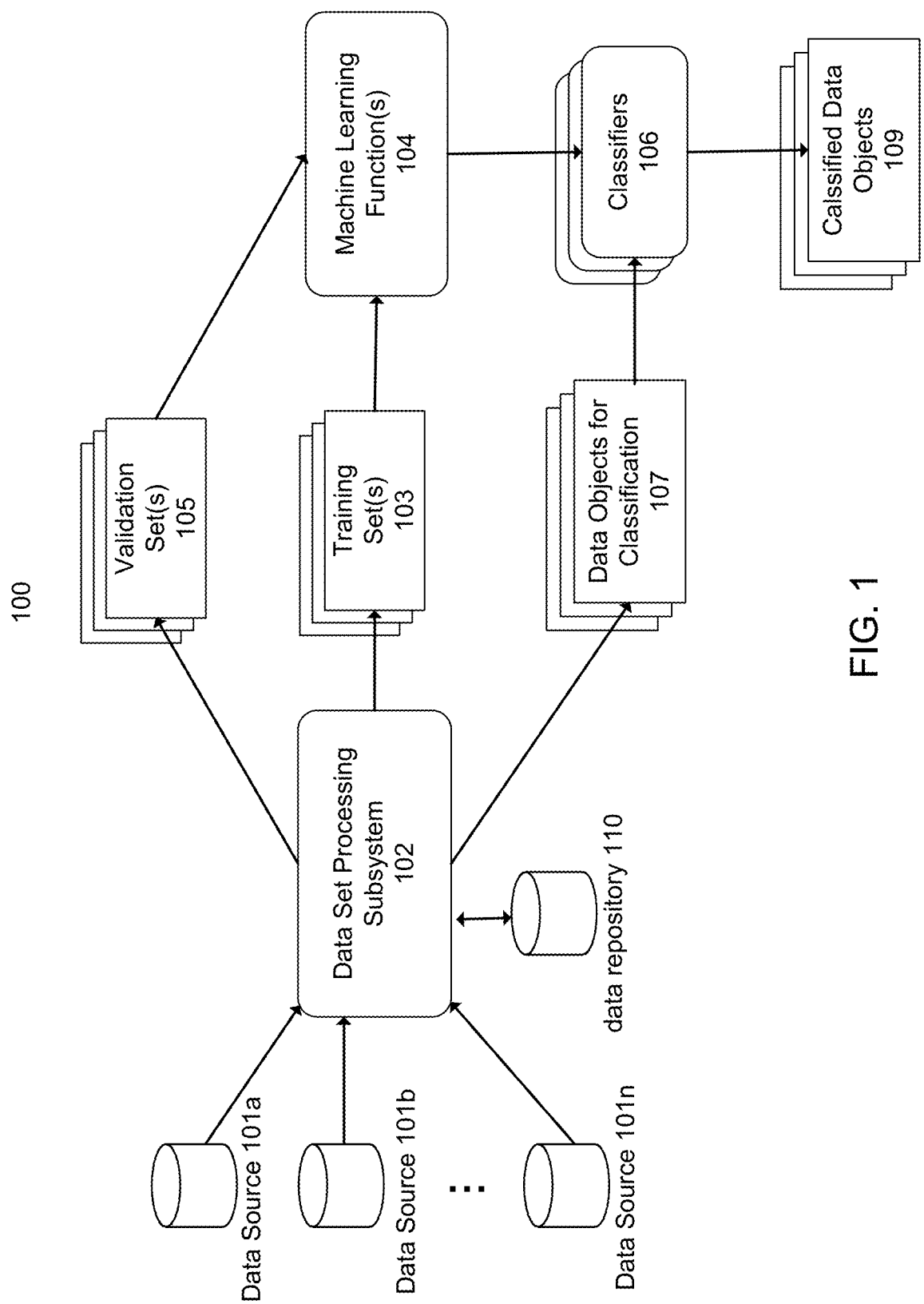
FIGS. 1-2B illustrates a machine learning system, according to an example.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to various examples, advanced techniques such as data mining and data transformation techniques may be used to generate accurate training sets for machine learning operations using data objects provided by multiple data sources. For example, the data objects from each of the data sources may be analyzed to estimate whether the data objects can be used to make accurate predictions. For example, quality of the data objects, periodicity of refresh of the data objects, data scarcity, etc., may be evaluated to help determine if data objects are amenable to accurate predictions. In addition, these aspects of data objects may be used for creating training sets. Also, information from multiple data sources may be used to supplement data in the data objects for the training set. Furthermore, examples described herein may employ different techniques for creating a training set, including techniques that can create a quality training set when data scarcity occurs. Improvements to the quality and accuracy of training sets may facilitate improved performance of classifiers generated from the training sets. For example, a classifier created from a high quality training set may produce more accurate classification of data objects into categories than a classifier created using a lower quality training set.

Also, according to an example, an ensemble classifier may be generated to classify data objects. The ensemble classifier may be generated from multiple machine learning functions, and may produce more accurate predictions than using a classifier generated from a single machine learning function.

With highly astute machine learning capabilities, more accurate and reliable predictive analytics may occur. One area that would benefit from such improved machine learning and predictive analytics is financial forecasting. Financial forecasts are critical in a budget preparation process. Financial forecasting may be used to evaluate current and future fiscal conditions to guide policy and programmatic decisions. A financial forecast is a fiscal management tool that presents estimated information based on past, current, and projected financial conditions. This may help identify future revenue and expenditure trends that may have an immediate or long-term influence on government policies, strategic goals, or community services. The forecast may be an integral part of the annual budget process. An effective forecast allows for improved decision-making in maintaining fiscal discipline and delivering essential community services.

Life events may also play a large role to affect a financial forecast. A technical problem associated with financial forecasting is that conventional systems do not consider life events in their forecast models. Such forecasts may understand that life events play a significant role, but there is no reliable solution that more accurately takes into account the likelihood of these life events and how they may specifically affect a financial forecast.

According to examples described herein, a machine learning and predictive analytics system that offers a more robust solution to financial forecasting may be provided. The machine learning and predictive analytics system may collect data from a variety of internal and external data sources (e.g., wealth and assets, life style and interests, demographics, macroeconomic factors, etc.) and perform various machine learning techniques. These techniques may include machine learning training, classification, clustering, predictive analytics, etc. Ultimately, taking anonymized segment data and individual customer data, the machine learning core may implement specialized processing and analytics to predict probability of life events occurring (e.g., purchasing a car, marriage, having a child, buying a house, etc.). The system may also predict probability of distribution of timing of life events and probability distribution of financial impact. The system may employ multiple sets of models in the processing and prediction of these events to generate up-to-date, real-time, or near-real-time outputs. These outputs may include forecasts, ratios, financial well-being indices, as well as recommendations for further actions.

Figure 2A:
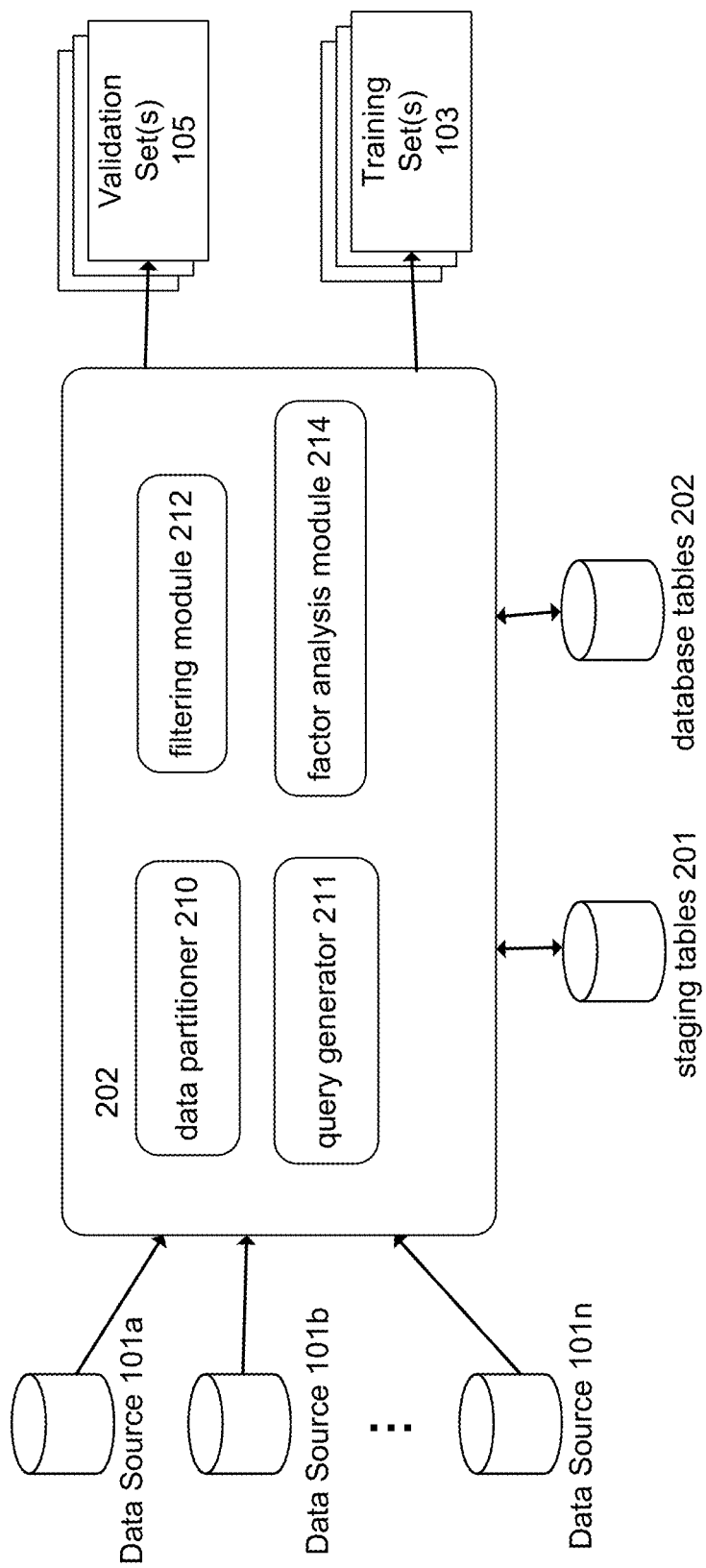
Figure 2B:
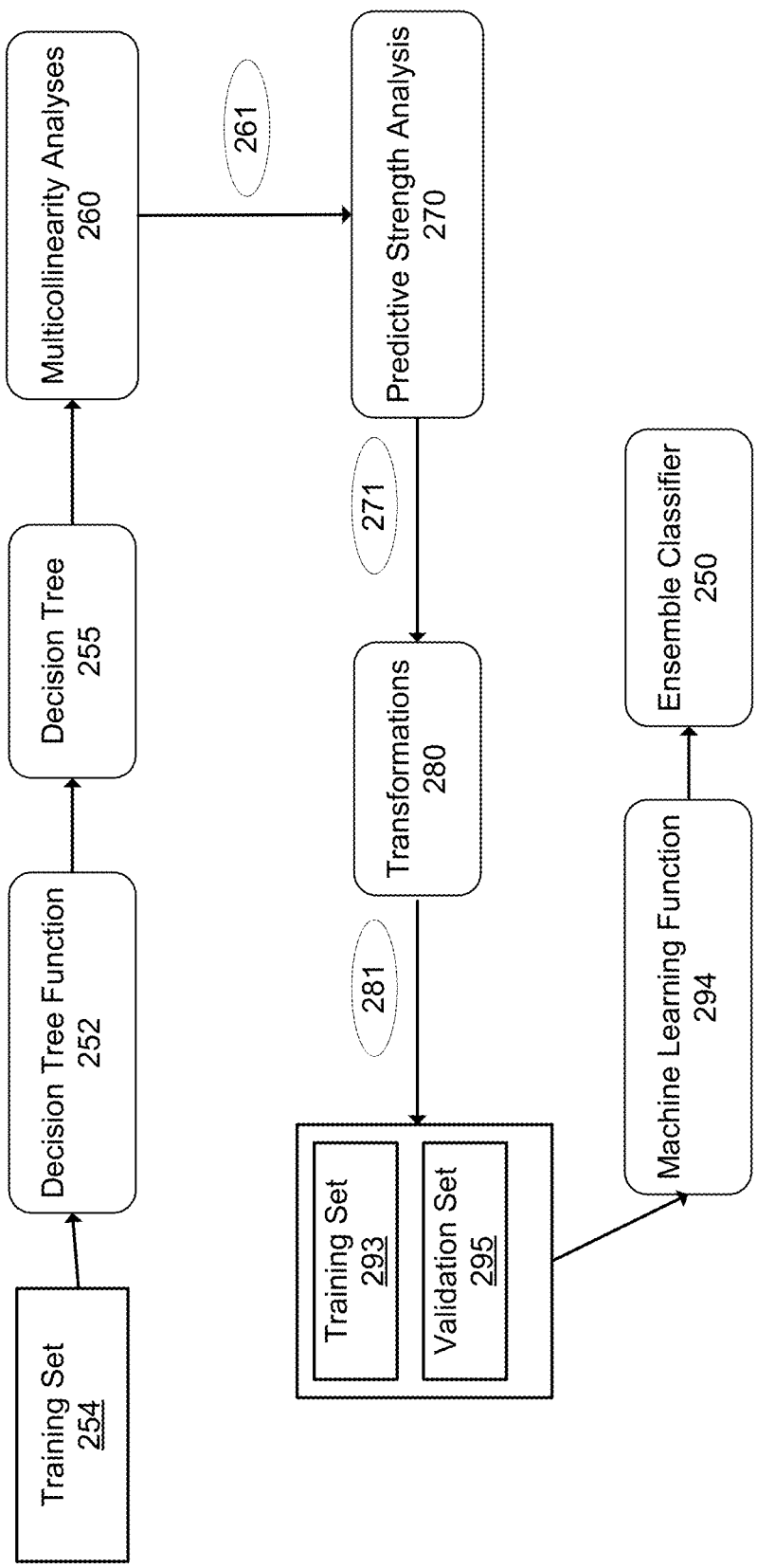

FIGS. 1-2B illustrates a machine learning system, according to an example. A data set processing subsystem 102 may process data from data sources 101a-n to generate training sets 103. The training sets 103 may include supervised training sets that include labeled data objects, which may be used by one or more machine learning functions 104 to train classifiers 106. The data set processing subsystem 102 may also process data from the data sources 101a-n to generate validation sets 105 to test the classifiers 106. Also, the data set processing subsystem 102 may identify data objects 107 to be classified, and may send the data objects 107 to the classifiers 106 to be classified. Alternatively, or in addition to, being sent from data set processing subsystem 102 to classifiers 106, the data objects 107 to be classified may be sent directly from one of the data sources 101 to the classifiers 106. The data set processing subsystem 102 may store data in a data repository 110 comprised of one or more data storage systems.

The information received from the data sources 101 may include data objects. A data object, for example, may be information to be classified or may be information that can be used for classification, such as metadata describing a data object to be classified. A data object may be represented by a vector of variables (also referred to as attributes), and a value for each variable that describes the data object. Examples of data objects may include, but are not limited to, numbers, files, images, documents, etc. By way of example, whereby the data object is a document, the document may be classified into a category, such as whether the document is a health document or whether the document is a financial document. In another example, a data object may comprise a health record for a patient, and the health record may be classified as to whether the patient is at risk for a particular disease. In yet another example, the data object may be procurement data used for procuring items, services, etc. For example, the data object may represent a bid to supply items, and the bid may be classified as to whether the bid is a high-risk bid, as is further described below. The classifiers may classify whether a bid includes a high-risk price, a high-risk supplier, or a high-risk item. The examples described above, and elsewhere herein, are non-limiting. For example, the classifier generation system 100 may be used to generate classifiers to classify other types of data objects.

The data set processing subsystem 102 may generate data sets, such as training sets 103 and validation sets 105. A data set may be a set of multiple data objects. A training set may be a data set of data objects used for inferring a function for classification (i.e., a classifier). The training sets 103 may include supervised training sets that include labeled data objects, which are used by one or more machine learning functions 104 to generate the classifiers 106. Each of the labels for the data objects may indicate whether the respective data object is classified under a particular category. Labels may be manually generated, may be specified in historic data, or may be generated automatically.

The data in an example, during a training phase, the training sets 103 are input into the machine learning functions 104. A machine learning function being used to train a classifier may adjust parameters in the classifier so that it makes accurate predictions for the training set 103. The machine learning functions 104 may include a known induction algorithm, such as Naive Bayes, C4.5 decision trees, Support Vector Machines, logistic regression, step-wise logistic regression, chi-squared tests for predictive variable selection, and others. Accordingly, inputting a training set to a machine learning function may generate a classifier, such as one of the classifiers 106, trained to classify the data objects into a category associated with the labels in the training set. After being trained, the classifiers 106 may be used to classify data objects without labels, such as data objects 107.

The data set processing subsystem 102 may perform data mining and data transformation techniques on data objects received from the data sources 101 to generate the training sets 103 to induce more accurate classifiers. The data set processing subsystem 102 may generate a data object from data received from multiple data sources. A data object may be comprised of multiple variables, which in turn may have been provided by multiple data sources. The data set processing subsystem 102 may collect and store the variables for each data object to build the training data sets 103 and validation data sets 105. A subset of the variables may be selected as predictive variables to induce a classifier.

According to an example, the data set processing subsystem 102 may perform data partitioning, filtering, data transformation to create data objects from multiple data sources. Staging tables may be used for the data processing performed by the data set processing subsystem 102. In an example shown in FIG. 2A, staging tables 201 may be used to create the data objects which are subsequently loaded into database tables 202, which may be used to generate the training and validation data sets 103 and 105. For example, data objects to be classified may represent vendors that supply items for use in satisfying a procurement request. For example, a training set of the training sets 103 may be generated to train a classifier of the classifiers 106 to classify vendors as "high-risk" or not. High-risk may be based on whether a vendor is likely to provide counterfeit or otherwise non-conforming items or not. Each data object may be comprised of multiple variables describing the vendors.

In an example, data from a reliable data source may be loaded into staging tables 201. For example, data source 101a may be associated with an internal procurement system having a data repository of historic procurement data captured, for example, over several years. Staging tables 201 may include fields from the data repository of historic data, including, for example, vendor name, vendor identifier (ID), etc. Multiple fields of the historic data may be included in the staging tables 201. These fields may be supplemented by additional fields based on data retrieved from other ones of the data sources 101, as is further described below.

Data partitioner 210 may partition loaded data. For example, a date range may be selected, such as the most recent six years of data, and stored in a partition in the staging tables 201. The data may be further partitioned to create validation data sets 105, and to identify a subset of the partitioned data, for example the most recent data (e.g., data for the last 12 months), which may include data objects 107 to be classified.

The data set processing subsystem 102 may include a query generator 211 to generate queries to retrieve related data from other ones of the data sources 101. Examples of the retrieved related data are described below. For example, the query generator 211 may automatically generate a query using fields from the staging tables 201 that are populated with data from the data source 101a (e.g., data from an internal system such as a procurement system or another trusted system). For example, the query generator 211 may generate a query with vendor name and vendor ID for a specific vendor record in the staging tables 201, and executes the query on other ones of the data sources 101. This may include interfacing with various data sources through an interface, such as an application programming interface (API), to execute the query. The query results may be received from the data sources 101b-n and stored in the staging tables 201. Retrieved information may include demographic information, such as address, vendor codes, industry codes, credit score, financial stress score, debarment indicator, criminal activity indicator, compliance risk index, number of total payments, number of slow, late and delinquent payments, bankruptcy indicator, number of employees, lawsuits, liens, judgments, and/or other variables and/or information describing the vendors. If the received data matches an existing field, such as in terms of data type, data range, etc., the data may be stored in an existing field; otherwise the data may be stored in a new field. Also, new fields may be manually analyzed after being populated to determine whether the fields include relevant data and to assign a field name and field constraints to the field. Through the data retrieval process, data objects may be created for the vendors, including multiple variables from multiple data sources, and the data objects may be stored in the staging tables 201.

Filtering module 212 and transformation module 213 may filter and transform data objects in the staging tables 201 for loading into the database tables 202. Filtering module 212 may perform quality checks and may filter variables that may not be predictive. For example, quality checks may be checking for null data or data outside field constraints, and evaluating variables in the staging tables 201 for data scarcity. Variables with a high rate of missing data or having no or little variation in value may be filtered (e.g., removed) and not loaded into the database tables 202. Next, for variables with an acceptable rate of missing values and having an acceptable variation of values, missing data may be populated with mean or median values for the variable depending upon the variable under consideration.

Variables from the staging tables 201 may be transformed by the transformation module 213 before loading into the database tables 202. Transformations may include executing a transformation function on a field before loading operation into the database tables 202 is performed. A transformation function may convert data to be placed in the same field to the same unit, such as a same unit of measurement, a same currency, a same lot size, etc., combine fields into a single field, create a new field, or execute other operations on a field. In an example, a variable may be created for foreign, electronics vendors that have an industry code for electronics and that have an address outside the United States. Another example of a transformation function may include applying an inflation cost adjustment to historic prices for present value calculations.

Also, prior to loading the database tables 202 from the staging tables 201, the variables in the staging tables 201 may be evaluated by a factor analysis module 214 to identify relationships between the variables and to identify variables that may be used as predictive variables for a classifier. While strong correlations between predictive variables and a target variable (e.g., the category being predicted) are desired, such high correlations between predictive variables themselves may be undesirable and can greatly affect the accuracy of the final classifier through multicollinearity. For example, the factor analysis module 214 may determine the predictive variables that are highly correlated, and may perform a factor analysis process to mitigate their effects. In the process, variables that are highly correlated with each other may be combined into a single variable which can then be used by one or more of the machine learning functions 104 to train a classifier without the consequences of multicollinearity, as long as those factors do not correlate with other variables.

After the factor analysis process is performed by the factor analysis module 214, the data from the staging tables 201 may be loaded into the database tables 202. The data for the data objects that is loaded into the database tables 202, including the variables describing the data objects, may be partitioned into the training sets 103 and the validation sets 105. For example, the data may be divided into a "training" set and a "validation" set. The validation set may be used to validate the classifier generated from the training set. For example, the validation set may include data objects predetermined to be in particular categories, and the trained classifier may classify data objects in the validation set to determine whether the classifier correctly classifies the data objects into their particular categories. Regarding the training set, data objects in the training set may be labeled. For example, if the data objects represent vendors, the labels may indicate whether the vendors are high-risk or not high-risk. In an example, the machine learning function trained according to the training set may be step-wise logistic regression, which may be used to generate one of the classifiers 106. The step-wise regression may determine relationships between predictive variables from the training set and the target variable being predicted, such as whether a vendor is a high-risk vendor. Following this operation, if the classifier is successful at predicting the target variable, the training and test sets may be combined and the classifier may be run again on the entire population of vendors in the combined training and test sets. The final classifier may be the classifier that is deemed successful at classifying the combined training and test sets.

Multiple classifiers may be created to classify different data objects into various categories. The staging tables 201 and database tables 202 may include tables to store data for different types of data objects. For example, vendor data objects may be stored in one set of tables, and data objects representing items to be procured may be stored in another set of tables, and so on. Training and validation sets may be generated for each of the classifiers 106 for training and testing. Each of the classifiers 106 may classify data objects into different categories. For example, a classifier may classify data objects representing vendors or suppliers, where the classifications indicate whether the vendors or suppliers are high-risk or not. In another example, a classifier may identify items to be procured as high-risk or not. Price risk classifiers may also be generated.

Processes described with respect to FIG. 2A may be performed to generate training and validation sets for a classifier to classify data objects for items to be procured as high-risk or not. For example, the data from an initial data set from data source 101a may be partitioned. Data objects for "general merchandise" may be removed since those items may be procured differently than other items, such as items prone to being high risk. Data objects may be further filtered and transformed, and factor analysis may be performed. Data objects indicative of a high-risk item may be labeled for the training set. Examples of the variables for the data objects representing items to be procured may include number of instances an item was purchased over the past six years, an indicator of an item's criticality, and whether the item had a diminishing manufacturing source etc.

As discussed above, an ensemble classifier may be generated to classify data objects. The ensemble classifier may be a classifier generated from multiple machine learning functions, and may obtain more accurate predictions than using a classifier generated from a single machine learning function.

FIG. 2B shows a data flow diagram for creating an ensemble classifier 250, which may be used as one of the classifiers 106 to classify the data objects 107, according to an embodiment. As discussed above, an item-risk classifier may be generated to classify data objects representing items to be procured as high-risk or not. The ensemble classifier 250 may be used for such a classifier, and creating the ensemble classifier 250 is described below, by way of example, with respect to generating an item-risk classifier. It should be appreciated that the ensemble classifier 250 may be generated to perform other types of classifications.

As shown in FIG. 2B, a decision tree 255 may be generated through supervised learning. For example, training set 254, which may be one of the training sets 103, may be applied to the decision tree function 252 to generate the decision tree 255. The training set 254 may include predictive variables and the target variable. The decision tree function 252 may be one of the machine learning functions 104. Decision trees compatible with embodiments disclosed herein may be generated using known techniques and/or software applications, such as a commercially available a machine learning software product. For example, R may be an open source suite of software facilities that include machine learning functions, such as one or more of the machine learning functions 104, and tools for performing other machine operations described herein. R may be a GNU project which was developed at Bell Laboratories® (now Lucent Technologies®) by John Chambers and colleagues. R may include a decision tree library which may be used for the decision tree function 252. Other machine learning tools may also be used to generate the decision tree 255. For example, open source software by WEKA (created by Mark Hall, Eibe Frank, Geoffrey Holmes, Bernhard Pfahringer, Peter Reutemann, Ian H. Witten (2009)) and SAS® Enterprise Miner™ are machine learning software that include machine learning functions and tools for performing other machine operations described herein.

The training set 254 may be a supervised training set including predictive variables and the labeled target variable (e.g., an indication of whether the item being procured was a high-risk item or not). The training set 254 may be generated from historic procurement data. Some examples of the predictive variables may include an amount of item purchased for each procurement, a quantity purchased in each procurement, a production lead time for the supplier to provide the item, a commonality of a unit in the bid specifying the amount of the item to be supplied, the type of item (e.g., microprocessors may be considered higher risk than a fastener), geographic location of manufacturing of the item, the use of the item (e.g., military versus civilian), past supplier history with respect to providing items, etc. Although not shown in FIG. 2B, the decision tree 255 may be validated with a validation set, such as described with respect to FIG. 1.

The decision tree 255 may identify ranges of values for continuous predictive variables (e.g., predictive variables which have values that lie on a continuum, such as procurement lead time) that are predictive of the target variable, and the decision tree 255 may identify binary values for categorical predictive variables (e.g., predictive variables which have values that are binary, such as whether an item was procured for military use or not) that are predictive of the target variable. The decision tree 255 may map the identified ranges of values for the continuous predictive variables and the identified binary values for the categorical predictive variables to conclusions about the target variable (e.g., high-risk or not). Embodiments may be configured to allow the mapping to be logically represented in a tree structure. Also, the decision tree function 252 may determine p-values for the predictive variables which indicate a level of significance for each predictive variable in predicting the target variable. The p-values may be determined by the machine learning software used to determine the decision tree 255. In an embodiment, the decision tree 255 may be generated over multiple iterations whereby different factors are changed, such as the predictive variables used in the decision tree, number of stages in the decision tree, etc.

From the decision tree 255, the predictive variables in the decision tree 255, may be analyzed for multicollinearity at 260. Multicollinearity means that one variable may be linearly predicted from another variable. The multicollinearity analyses performed at 260 may identify collinearity of the predictive variables. The multicollinearity analyses performed at 260 may include the analysis similar to, or the same as, the factor analysis performed by the factor analysis module 214 described above. Examples of machine learning software described herein may include tools for determining multicollinearity of predictive variables. For example, R may include a library for identifying collinearity among predictive variables through variance inflation factors (VIF). A VIF for a single predictive variable may be obtained using the r-squared value of the regression of that variable against all other predictive variables. The higher the VIF value, the higher the collinearity, and a predictive variable with a high VIF value (e.g., 5-10) may be removed. Accordingly, from the multicollinearity analysis performed at 260, a set of predictive variables 261 may be determined that includes predictive variables from the decision tree 255, whereby the collinear predictive variables are removed.

The set of predictive variables 261 may be provided for additional predictive strength analysis at 270. For example, Chi-square tests may be conducted on categorical predictive variables to assess and reaffirm strength of the categorical predictive variables from the set 261. T-tests may be conducted to assess and reaffirm strength of the continuous predictive variables from the set 261. These tests may determine the p-values of the predictive variables in the set 261, and the predictive variables having p-values less than a threshold (e.g., 0.05) may be removed from the set 261 to create a set of the predictive variables 271, which may be estimated to have a level of significance (e.g., a highest level of significance) for predicting the target variable.

Transformations may be performed on the set of the predictive variables 271 at 280. Transformations may include transforming predictive variables in the set 271 into new predictive variables, such as through stepwise regression. For example, assume the decision tree 255 identifies ranges of values for the production lead time predictive variable as follows: less than 179 days is high-risk, greater than 179 days but less than 280 days is not high-risk, and greater than 280 days is high-risk. The transformations may assess whether to convert this into two predictive variables, such as one predictive variable for less than 179 days or greater than 280 days for high-risk, and one predictive variable for not high-risk (between 179 and 280 days), or whether to keep it as. Also, after the transformations are performed, multicollinearity may be analyzed again, such as performed at 260, to remove collinear predictive variables, and a set of predictive variables 281 may be generated from the set 271, which includes the transformed variables, and which does not include predictive variables determined to be collinear.

The ensemble classifier 250 may be generated and validated using the predictive variables from the set of predictive variables 281. For example, a training set 293, which may be one of the training sets 103, and a validation set 295, which may be one of the validation sets 105, may include the set of predictive variables 281. The training set 293 may be applied to machine learning function 294, which may be one of the machine learning functions 104, to generate the ensemble classifier 250. The ensemble classifier 250 may be tested with the validation set 295. The generation and testing may be an iterative process. In an example, the machine learning function 294 may be a logistic regression machine learning function, such as a Bernoulli Naive Bayes logistic regression function.

Figure 3:
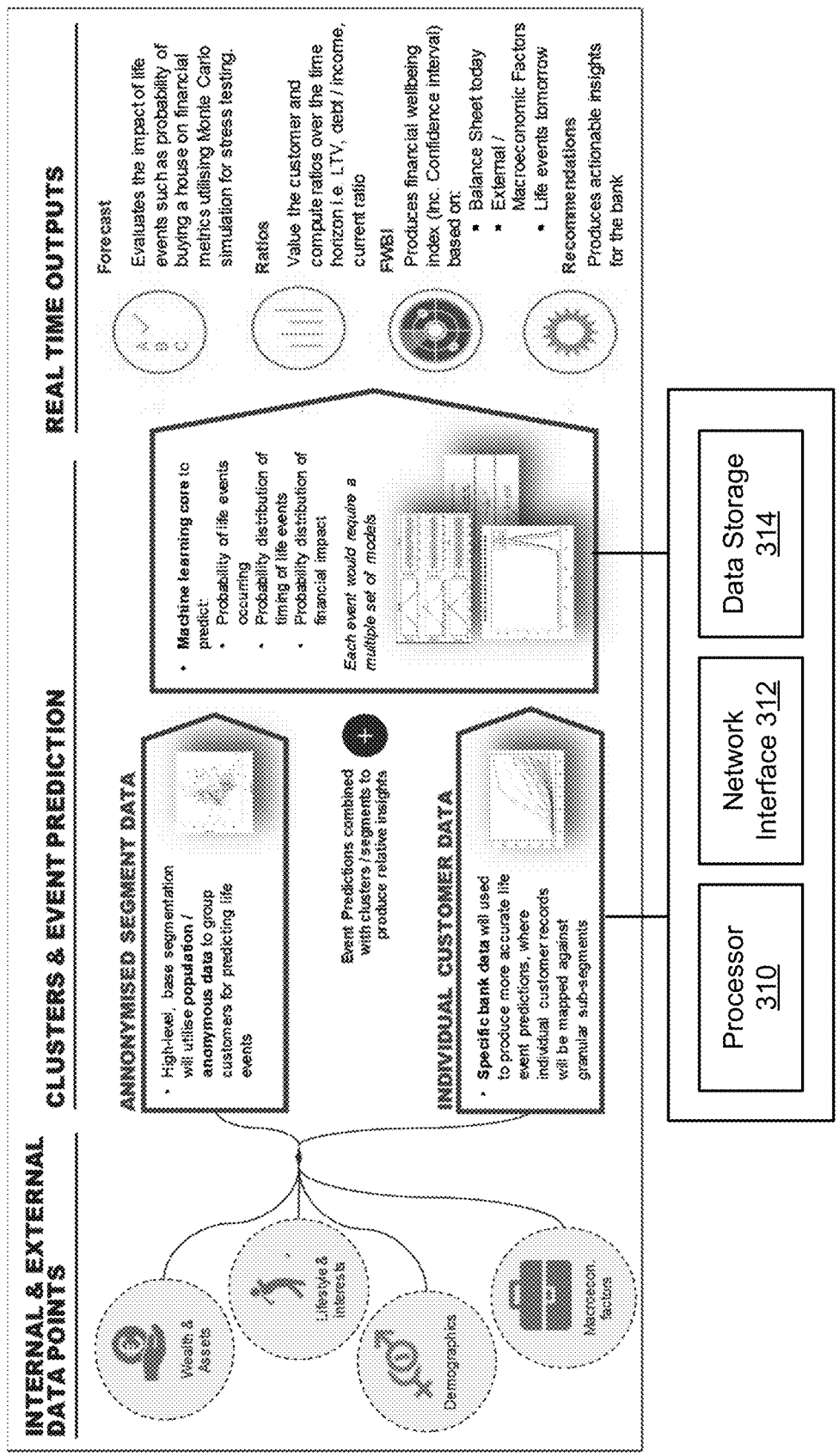

Other types of data objects and classifiers and models may be generated by the system 100. For example, "should-cost" models may be generated to identify costs associated with transactions, as is further discussed below. FIG. 2A and FIG. 3, which is described below, are described with respect to using staging and database tables for the dataset processing. In other embodiments, other storage structures may be used.

FIGS. 3-4 illustrate a machine learning and predictive analytics system 300, according to an example. The machine learning and predictive analytics system 300 may collect data from a variety of internal and external data sources. These may include, but not limited to, wealth and assets, life style and interests, demographics, macroeconomic factors, etc.

These internal and external data sources, for example, may operate in a network and may include systems, subsystems, applications, and/or interfaces to collect information from enterprise resource planning (ERP) systems and applications 102 (hereinafter "ERP"), documents, web feeds, machine and sensor data (hereinafter "sensor data"), and geolocation data, all of which may be distinct or integrated with the system 300. The internal and external data sources may include other data or information sources as well. It should be appreciated that each of these data sources may further include its own data feed, storage, system, application, or other source for collecting and sending data and information, including third party or indirect sources.

The ERP may include one or more application servers that host various ERP applications. These may include, for example, a customer relationship management (CRM) platform, system, or application. The ERP may collect, store, manage, and interpret data associated with various enterprise functions or activities. The ERP may provide an integrated and continuously updated view of core business processes using common databases maintained by a database management system. The ERP may track enterprise resources, as well as corporate or business transactions. Furthermore, the applications that make up the ERP may share data across various departments (e.g., manufacturing, purchasing, sales, accounting, etc.) that provide the data. The ERP may facilitate information flow between many enterprise functions and may manage communications with stakeholders or other outside parties. As a result, the ERP may contain large quantities of information and data associated with a company, its clients, and/or its employees.

The documents may provide another source of data. Data received at the documents may include files, emails, faxes, scans, or other documents that are transmitted, received, and stored in an enterprise environment. The web feeds may be yet another source of data. Data received at the web feeds may include data from various web sources, such as social media, syndication, aggregators, or from scraping. This may also include RSS feeds, which allow users to access updates to online content. Data from social media may also include any type of internet-based application built upon creation and exchange of user-generated content, which may include information collected from social networking, microblogging, photosharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing.

The machine and sensor data may be another source of data and information. For example, in a network, there may be physical devices, vehicles, appliances, and other enterprise systems that are equipped with electronics, software, and sensors, where most, if not all, of these items are within a network and share some measure of connectivity which enable these and other pieces of equipment to connect, communicate, and exchange data. This may allow various systems, objects, and items in a network environment to be detected, sensed, or remotely controlled over one or more networks, creating a vast array of enterprise functionalities. These may include abilities to provide data analytics on equipment, assessment of equipment health or performance, improved efficiency, increased accuracy or function, economic benefit, reduction of human error, etc. By creating a "smarter" environment and leveraging interactivity between various pieces of equipment in a network, the machine and sensor data may provide significant amounts of information and data that can be collected. One example may include a mobile device or Internet of Things (IoT)/wearable technology (e.g., smart watch). Other examples may include automobiles or enterprise locations, all of which may be equipped with various machine and sensor data.

The geolocation data may include information or data associated with identification or estimation of real-world geographic location of an object, such as a radar source, mobile device, or web-based computer or processing device. Geolocation data may provide specific geographic coordinates or data that may be used for monitoring location, distinct or together with, other various positioning systems or applications. For example, the geolocation data may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data may include other self-disclosing or self-identifying information, including but not limited to country, region county, city, postal/zip code, latitude, longitude, time zone, domain name, connection speed, ISP, language, proxies, or other information that can be used to piece together and trace location. This and other data may be collected, monitored, and analyzed to help assess and predict life events or improve machine learning, as described herein.

Referring back to FIG. 3, the system 300 may perform various machine learning techniques on this data. These techniques may include machine learning training, classification, clustering, predictive analytics, etc. Ultimately, taking anonymized segment data and individual customer data, or other relevant data, the machine learning core of the system 300 may implement specialized processing and analytics to predict probability of life events. For example, these may include purchasing a car, getting married, having a child, buying a house, children starting school or college, getting a divorce, retirement, death of loved one, change in employment or career, etc. The system 300 may also predict probability of distribution of timing of life events and probability distribution of financial impact. Details of these features may become more apparent below.

The machine learning and predictive analytics core may include a processor 310, network interface 312, and a data storage 314. The processor 310 may be an integrated circuit, and may execute software or firmware or comprise custom processing circuits, such as an application-specific integrated circuit (ASIC) or field-programmable gate array (FPGA).

The network interface 312 may be any number of hardware, network, or software interfaces that serves to facilitate communication and exchange of data between any number of or combination of equipment, protocol layers, or applications. For example, the network interface 312 may each include a network interface to communicate with other servers, devices, components or network elements via a network in the system.

The data storage 314 may include volatile and/or non-volatile data storage that may store data and software or firmware including machine-readable instructions. The software or firmware may include subroutines or applications that perform the functions of the system and/or run one or more application that utilize data from the system. Other various server components or configurations may also be provided.

The system may employ multiple sets of models in the processing and prediction of these events to generate up-to-date, real-time, or near-real-time outputs. These outputs may include forecasts, ratios, financial well-being indices, as well as recommendations for further actions. Details of these system components features and may become more apparent below.

FIG. 4 illustrates the data flow 400 of the machine learning and predictive analytics system 300 of FIG. 3. For example, data may be collected at the input. These may include various financial sources, as well as other personal data from various internal, external, or third part data sources, as described above. The machine learning and predictive analytics system 300 may cluster this data into similar groups for machine learning classification and training. Various models may be used, such as Bayesian Hierarchical clustering or K-means clustering. Other models may also be provided.

The machine learning and predictive analytics system 300 may implement the machine learning processes and techniques described herein to predict probability of life events, including distribution, timing, and financial impact. The predictions may include estimate date of life event, probability or likelihood of occurrence, prediction of value and % change, etc. This may be achieved using at least the machine learning core and predictive analytics system 300. Life event predictions may include major life events, such as buying a house, having a baby, getting married, children starting school, retirement, etc. Ongoing life events may include income changes, work-related promotions, changes in mandatory expenditures, changes in discretionary expenses, etc. Details of these examples may be described in more detail below. Other various predictions or values may be determined.

The machine learning and predictive analytics system 300 may also provide forecasting, ratios, index, and recommendations. Various models may be used for forecasting. One such model may include a Monte Carlo technique for simulation and stress testing, which may involve various computation and calculation steps. These may include probability distributions, repetition, and evaluation of edge cases for stress modeling. Such forecasts may be used to help evaluate impact of life events on financial metrics. For ratios, value of customer and value over a time horizon may be determined. A weighted sum of relevant financial metrics may be used to provided index or indices. Recommendations may be based on producible actionable insights from the ratios compared to pre-set criteria. Other models and techniques may also be provided.

Figure 5:
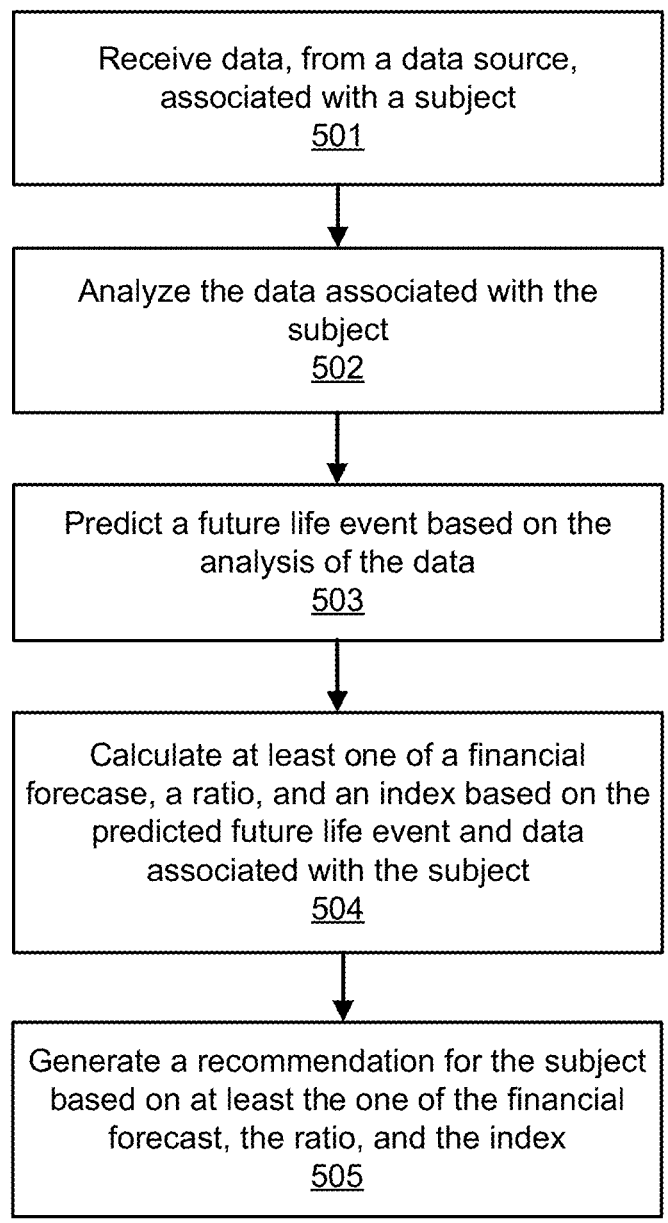
FIG. 5 illustrates a method for machine learning and predictive analytics, according to an example.

FIG. 5 illustrates a method 500 for machine learning and predictive analytics, according to an example. The method 500 is provided by way of example, as there may be a variety of ways to carry out the method described herein. Although the method 500 is primarily described as being performed by system 300 of FIG. 3 and/or engine 800 of FIG. 8, the method 500 may be executed or otherwise performed by one or more processing components, or by another system or a combination of systems. Each block shown in FIG. 5 may further represent one or more processes, methods, or subroutines, and one or more of the blocks may include machine readable instructions stored on a non-transitory computer readable medium and executed by a processor or other type of processing circuit to perform one or more operations described herein.

At block 501, a data access interface, may receive data associated with a subject. In an example, the subject may be an account holder of a financial institution. In an example, the data may be received from a data source. The data source may be an enterprise resource planning (ERP) system, a document, a web feed, a sensor, a geolocation data source, an enterprise database, a financial database, a private database, a public database, a server, an analytics tool, a mobile device, an external social media data source, a reporting system, or other data source. In an example, the data source may be an internal data source, an external data source, or a combination thereof. For example, the internal data source may be a financial database of a financial institution associated with the subject. This financial database may store personal and financial information associated with the subject. The external data source may be a public database and/or a web feed associated with the subject. The public database may store population data and may be associated with a census database. Population data may include information related to the subject's age, income potential, geography, life situation, demographic, etc. The web feed may include data from social media, RSS, syndication, aggregators, and web scraping. Other various data sources may be provided as well.

At block 502, a processor of the system 300, for example, may analyze the data associated with the subject. In an example, the data may be analyzed based on a clustering technique. As described herein, the clustering technique may be agglomerative hierarchical clustering, Bayesian hierarchical clustering, K-means clustering, mean-shift clustering, density-based spatial clustering of applications with noise (DBSCAN), expectation-maximization (EM) based clustering, Gaussian Mixture Model (GMM) based clustering, or a combination thereof. Other techniques may also be provided.

At block 503, a processor of the system 300, for example, may predict a future life event based on the analysis of the data. As described herein, the future life event may include purchasing a car, getting married, having a child, purchasing a home, children starting school or college, getting a divorce, relocation, retirement, death of a loved one, change in employment or career, or other life event. While directed to relatively large life events, it should be appreciated that examples described herein may also be directed to other various life events small or large. These may include any event that may initiate a financial action, such as a requesting a financial product or service. The prediction of the future life event may also include a project date, timeframe, value, accuracy/probability rating, or other helpful estimations. The prediction may also be adjusted in real-time or near real-time, and may be based on flow or weighting of received data from various data sources.

At block 504, a processor of the system 300, for example, may calculate a financial forecast, a ratio, and/or an index based on the predicted future life event and data associated with the subject. In one example, the financial forecast, a ratio, and/or an index may be calculated based on financial data of a financial institution and based on external social media data. It should be appreciated that the processor may use any number of machine learning, statistical analysis, simulation, and/or modeling techniques for its calculations. In one example, the financial forecast may be based on a Monte Carlo simulation for stress testing. In some examples, the financial forecast, ratio, index, and/or other calculation may represent a likelihood of the subject taking a financial action with a financial institution. For example, the financial action may include applying for, requesting information related to, or securing a loan, a mortgage, a credit card, a line of credit, banking options, crowdfunding, financial savings, investment options, financial planning services, or other products or services.

At block 505, a processor of the system 300, for example, may generate a recommendation based on the financial forecast, ratio, index, and/or other calculation. In an example, the recommendation may include one or more financial actions for the subject to take or elect based on the predicted life event. In some examples, the recommendation is transmitted via a communication, such as an email, a textual message, an audio communication, a visual message, a personal call, a report, and/or other communication. The communication may be automatic, supervised, or manual, and/or may be performed by one or more systems, applications, or persons.

Figure 6A:
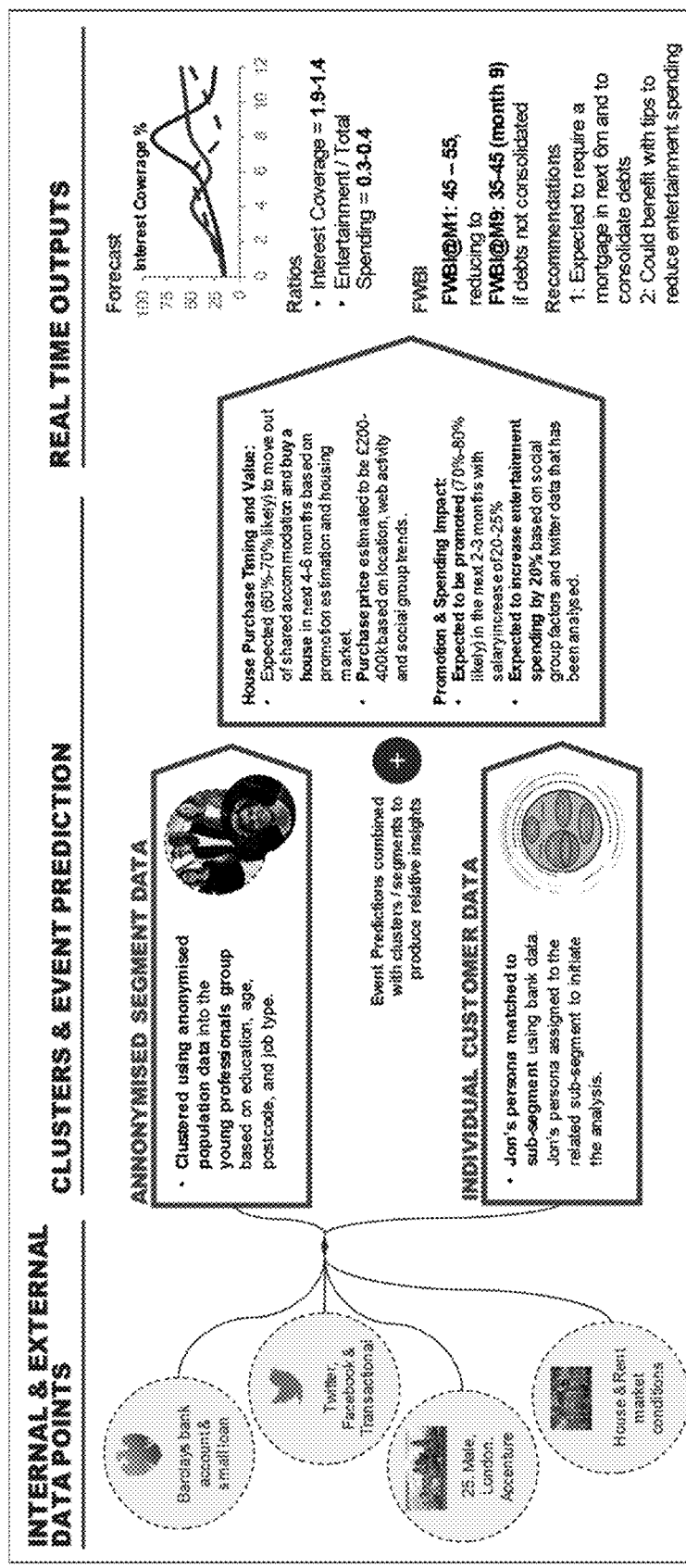
FIGS. 6A-6E illustrate examples of life event prediction based on machine learning and predictive analytics, according to various examples.

FIGS. 6A-6E illustrate examples of life event prediction based on machine learning and predictive analytics, according to various examples. FIG. 6A illustrates an example of life event prediction based on machine learning and predictive analytics, according to an example. In this example, the sample customer may be "Jon." For Jon, internal and external data points may originate from a variety of data sources. In an example, data may be received from his Barclay's bank account and loan, social media, property (e.g., house) ownership details, work/employment, etc. This data may be in the form of individual customer data or anonymized segment data. For example, individual customer data may be specific to Jon (e.g., bank accounts, social media presence, etc.). Anonymized segment data may include population data clustered into a similar group of professionals like Jon. This may be based at least in part on education, age, postcode or geography, job type, country, race or ethnicity, or other subcategory. Machine learning and predictive analytics may then be based on clusters or segments to produce relative insights on a variety of life situations or events that are expected in Jon's life. These may include purchasing a car, getting married, having a child, buying a house, children starting school or college, etc. These may also include getting a divorce, retirement, death of loved one, change in employment or career, etc. The system 300 may use this information to predict a probability of distribution of timing of life events and a probability distribution of financial impact. For instance, the system 300 may be able to predict when Jon is likely to buy a house and the price range or location of interest. This may be based on this current job situation and expected promotions and spending impact. Accordingly, the system 300 may then provide real-time or near-real-time financial forecasts to determine likelihood that Jon will buy a house. These financial forecasts and metrics may then be presented in the form of recommendations. For example, the bank with which Jon has an account may see that Jon is expected to buy a house in the next 6 months, and therefore, would offer Jon tips on how to prepare to achieve this goal, e.g., consolidate debts, spend less on entertainment, etc. Details of specific life event predictions may be provided below.

Figure 6B:
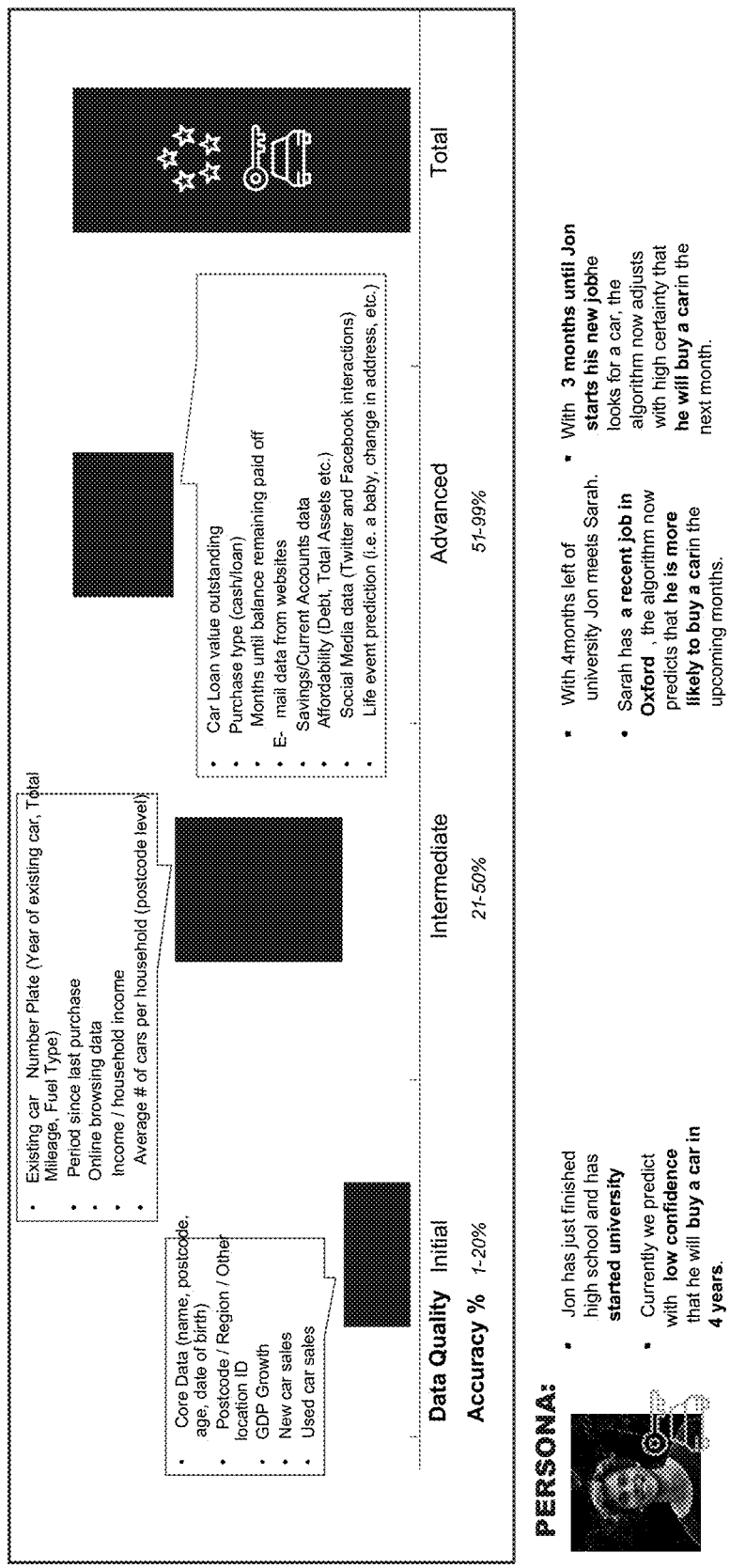

FIG. 6B is an example of data flow and calculations involved in the prediction probability of a life event of purchasing a vehicle. Referring to another example using sample customer "Jon," there may be several ways to identify whether Jon is likely to purchase a car or not. For example, if it is identified, based on individual customer data and anonymized segment data, that Jon has just finished high school and has just started college/university, the system 300 may determine that there is low confidence that John will buy a car over the next four years. The individual customer data and anonymized segment data, for example, may suggest that students who enroll in or attend Jon's school do not typically drive cars. New or used car dealerships may also overcharge in that geographical area making it more challenging for students to purchase cars. Moreover, Jon may not have a job, a rich uncle, or other financial means at that time. Thus, the system 300 may predict a low likelihood that Jon will purchase a car any time soon. However, the better the data quality (as it pertains to Jon), the more accurate the predictive analytics may be.

For instance, even if Jon does not appear to be likely to buy a car, perhaps his browsing history reveals that he has been looking at new cars, etc. online. Other data may also suggest that Jon currently uses a really old car—one that might need replacing because of recent accidents, maintenance requirements, etc. This may indicate a potential interest in purchasing a new car is not as far off as initial predictions may have suggested. In fact, after some time school, say with 4 months before graduating, the new car searches may have intensified and the maintenance on the old car increased. It may be determined from various data sources, at that time, that Jon also meets Sarah and is involved in a romantic relationship with her. The fact that she attends another university some distance away from his school, Jon may need to drive more in order to keep the new relationship going. Because the data may also suggest a surge in new car interest, savings account accruals, etc. the system 300 may determine that Jon is more likely to buy a car in the next few months and adjust the forecasting. Perhaps Jon has already locked down a job once he graduates. The system 300 then may adjust its predictive analytics and determine, with high certainty, that Jon will buy a car in the next month or so. Accordingly, Jon's bank, having this information, may then reach out to Jon with recommendations, such as loan information, top-rated or partner car dealerships nearby, discounts, etc.

Figure 6C:
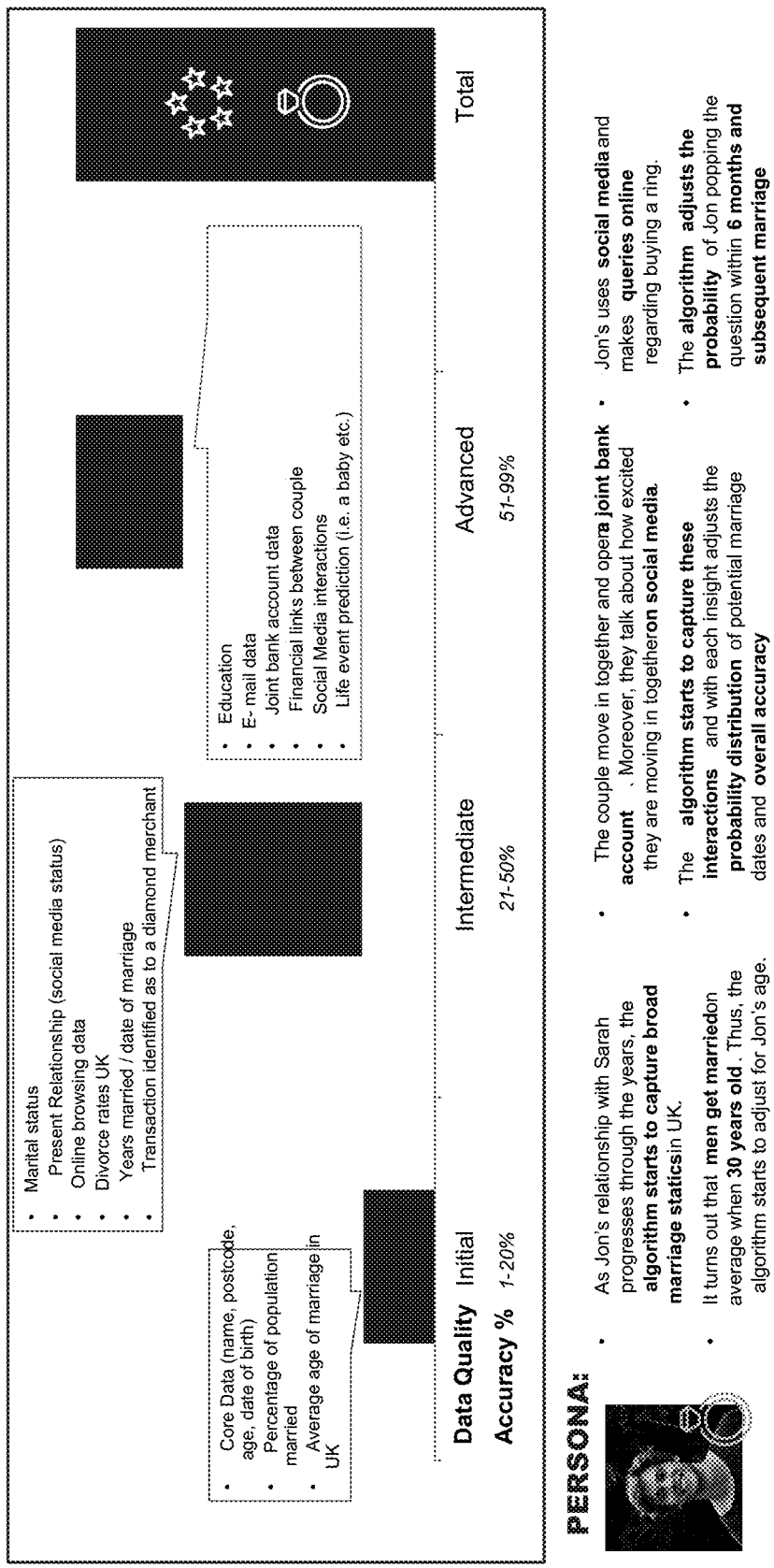

FIG. 6C is an example of data flow and calculations involved in the prediction probability of a life event of getting married. As Jon's relationship with Sarah continues to progress through the years, the system 300 may begin by capturing broad marriage statistics. For example, these marriage statistics may be based on Jon's age group, educational background, geography, etc. In an example, it may be determined that men get married on average at around 30 years of age. Because Jon is not quite at that age yet, the system 300 may begin to account for this and determine that with a lower probability that Jon will be getting married any time soon. Nevertheless, Jon and Sarah have decided to move in together and have opened a joint bank account. Social media data have suggested that discussions about cohabitation have increased. The system 300 may recognize this from the received data and may capture these interactions, readjusting the potential likelihood of marriage for Jon and Sarah. Probability of marriage and date prediction may increase when system 300 collects social media data or browsing history information with regard to Jon looking for an engagement ring. For example, taking various data and using machine learning and predictive analytics, the system 300 may determine that Jon is likely to ask Sarah to marry him (and that she is likely to accept) within 6 months and predict a wedding date.

Figure 6D:
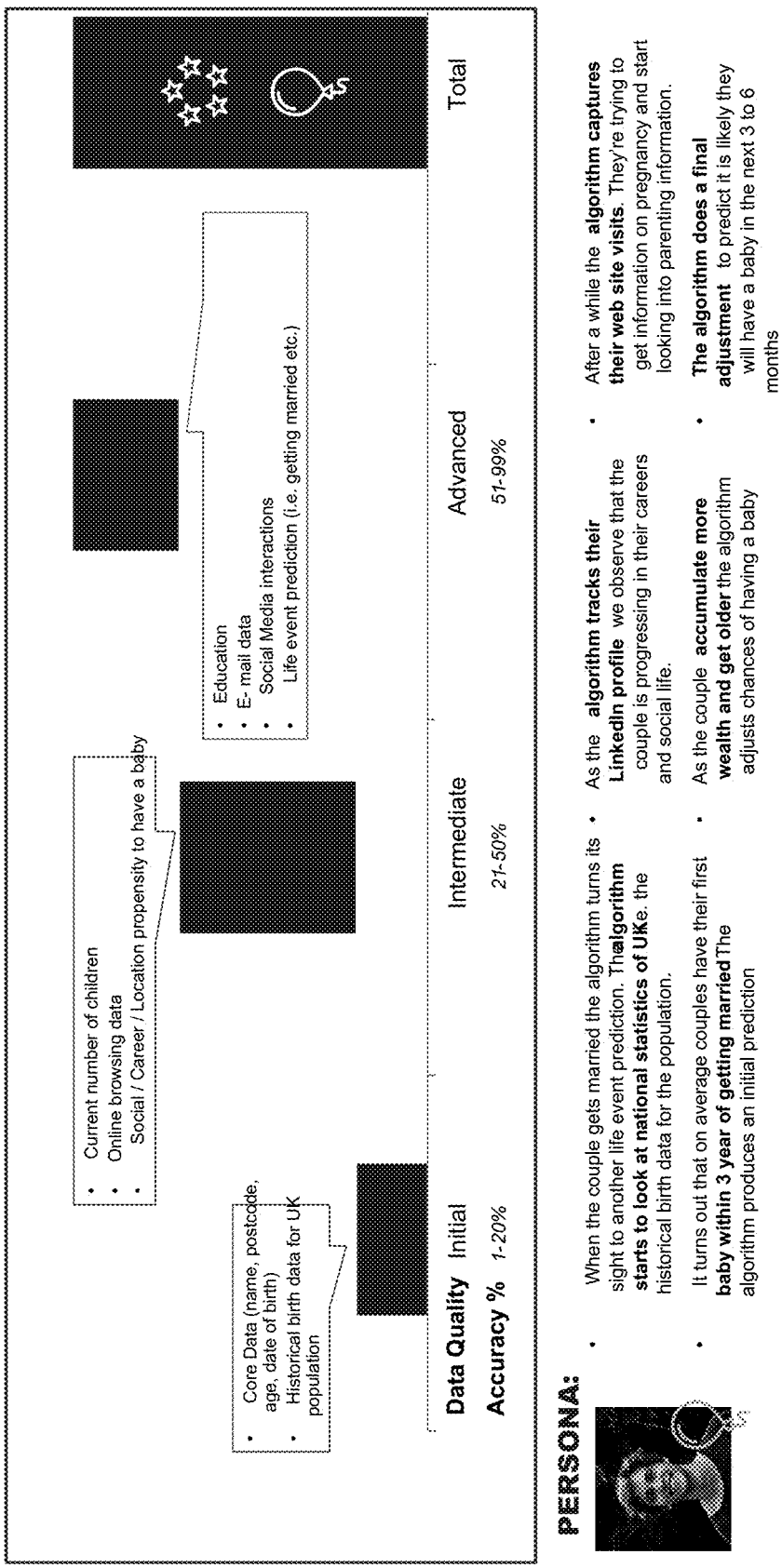

FIG. 6D is an example of data flow and calculations involved in the prediction probability of a life event of having a child. Now that Jon and Sarah have gotten married, the system 300 may turn its sight to the next potential life event—having a child. The system 300 may begin to do this by learning national statistics regarding the geography of Jon and Sarah to determine historical birth data. As it turns out, such data may reveal that average couples having their first baby within 3 years of getting married. Accordingly, the system 300 may generate an initial prediction using this and other information. As the system 300 tracks their social media presence and other available data, the system 300 may recognize that they are also progressing well in their careers and social life. As a couple, they are spending more wisely, saving up money, and getting wealthier, all of which may point to likelihood of having a baby or other major downstream life events. After the system 300 captures their website visits, it becomes clear the couple has been frequenting websites about pregnancy and starting a family. The system 300 may adjust to these findings in real-time or near-real-time and predict that it is likely they will be having a baby in the next 3 to 6 months or so. With more and more acquired data, the system 300 may be able to fine-tune the prediction model and provide more accurate assessments and recommendations for the couple.

Figure 6E:
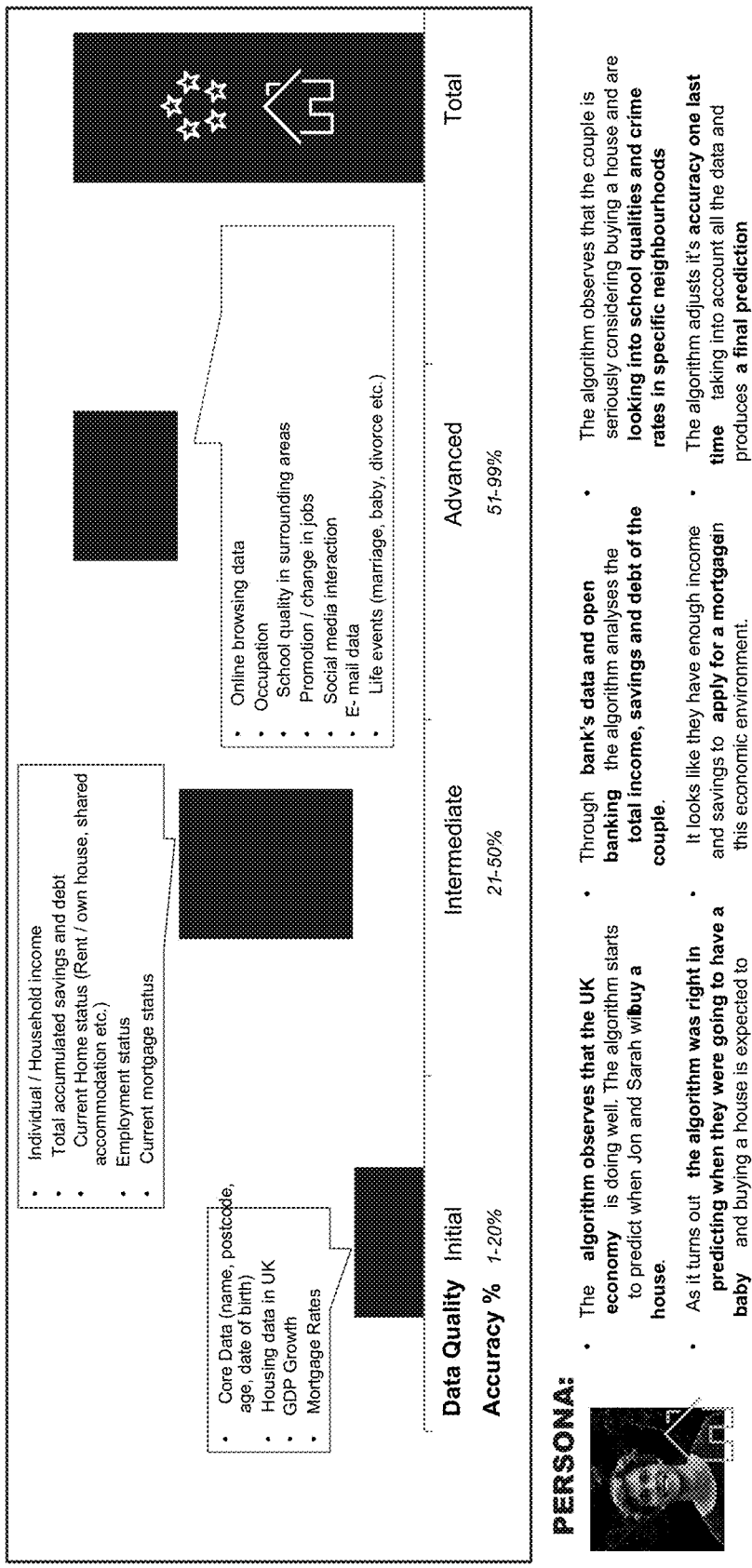

FIG. 6E is an example of data flow and calculations involved in the prediction probability of a life event of purchasing a home. Together or separately with having a first child, the system 300 may recognize that the couple is doing well in their careers and becoming wealthier. With data that suggests a booming housing market, the system 300 may predict that Jon and Sarah will buy a house soon. Having a baby or getting ready to have a baby may also coincide with buying a new house. Through financial data, opening banking, real estate assessments, income, savings, debt determinations, etc., the system 300 may predict that Jon and Sarah are on track to buying a home. The couple may also be perusing schools, various neighborhoods, checking out crime rates, etc., all of which are indicative of such a move. Together with information about their current home (perhaps an expiring lease), the system 300 may provide more accurate prediction of when they might be looking to secure a new home. With all this data, the system 300, for example, may adjust accuracy and provide a final prediction that the couple will be applying for a mortgage soon or buying a house by a certain date.

The above are exemplary and serve to illustrate the comprehensive, robust, and detailed nature of the machine learning and predictive capabilities of system 300. As more and more data is received and analyzed, the system 300 may be able to predict various life events with greater and greater accuracy. Such predictions may be dynamic, constantly being updated in real-time or near-real-time based on flow of available data. As described, such predictions may enable various products and services to be offered to customers. For example, a bank may be able to offer Jon recommended loan options when he about to buy a car or home, or suggest preferred car dealerships or mortgage recommendations for Jon and Sarah as they prepare to buy their new home. Jon and Sarah may also be able to receive information about health care information as they prepare to add a new child to their family, or how to prepare for financial planning once the child is born. A host of various products and services may be available to customers using the machine learning and life event prediction and analysis that comes with system 300.

Figure 7:
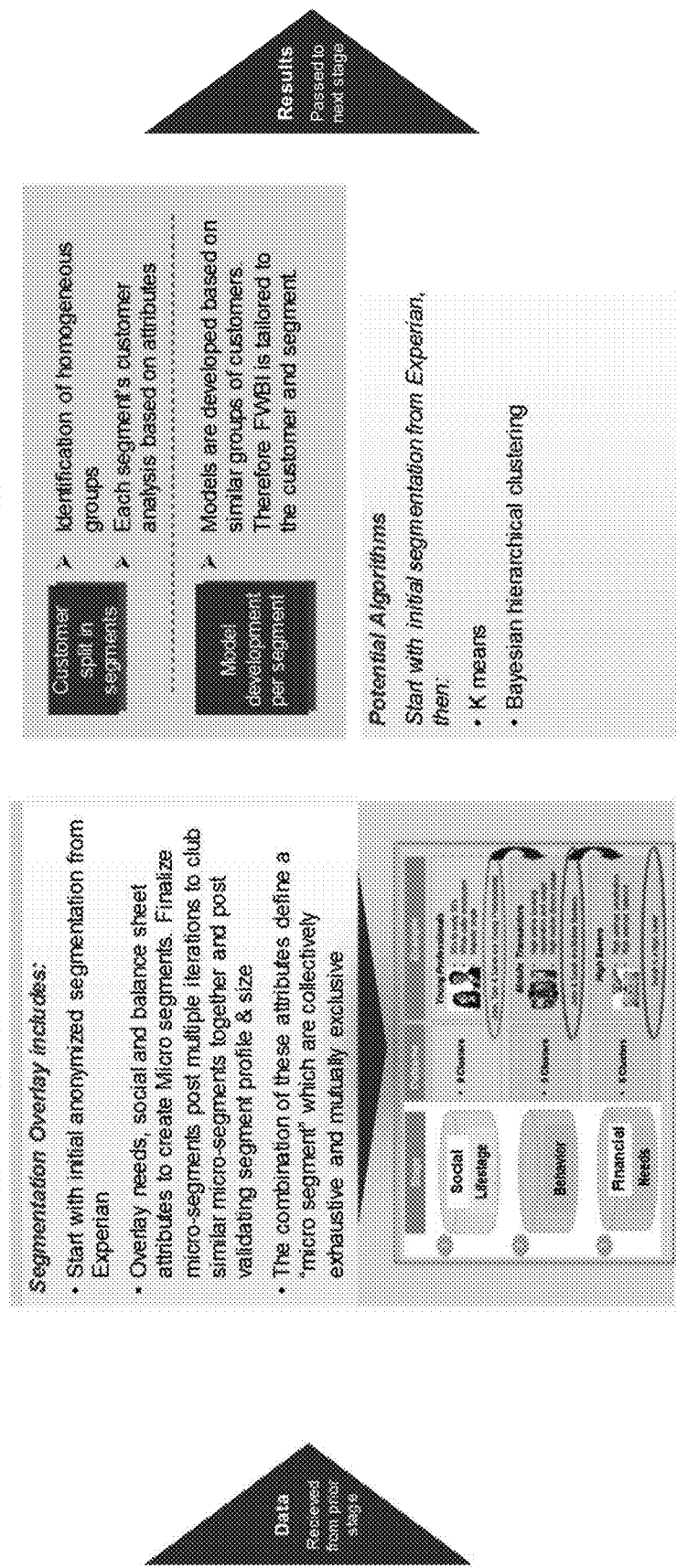
FIGS. 7-8 illustrate a clustering system and process, according to an example.
Figure 8:
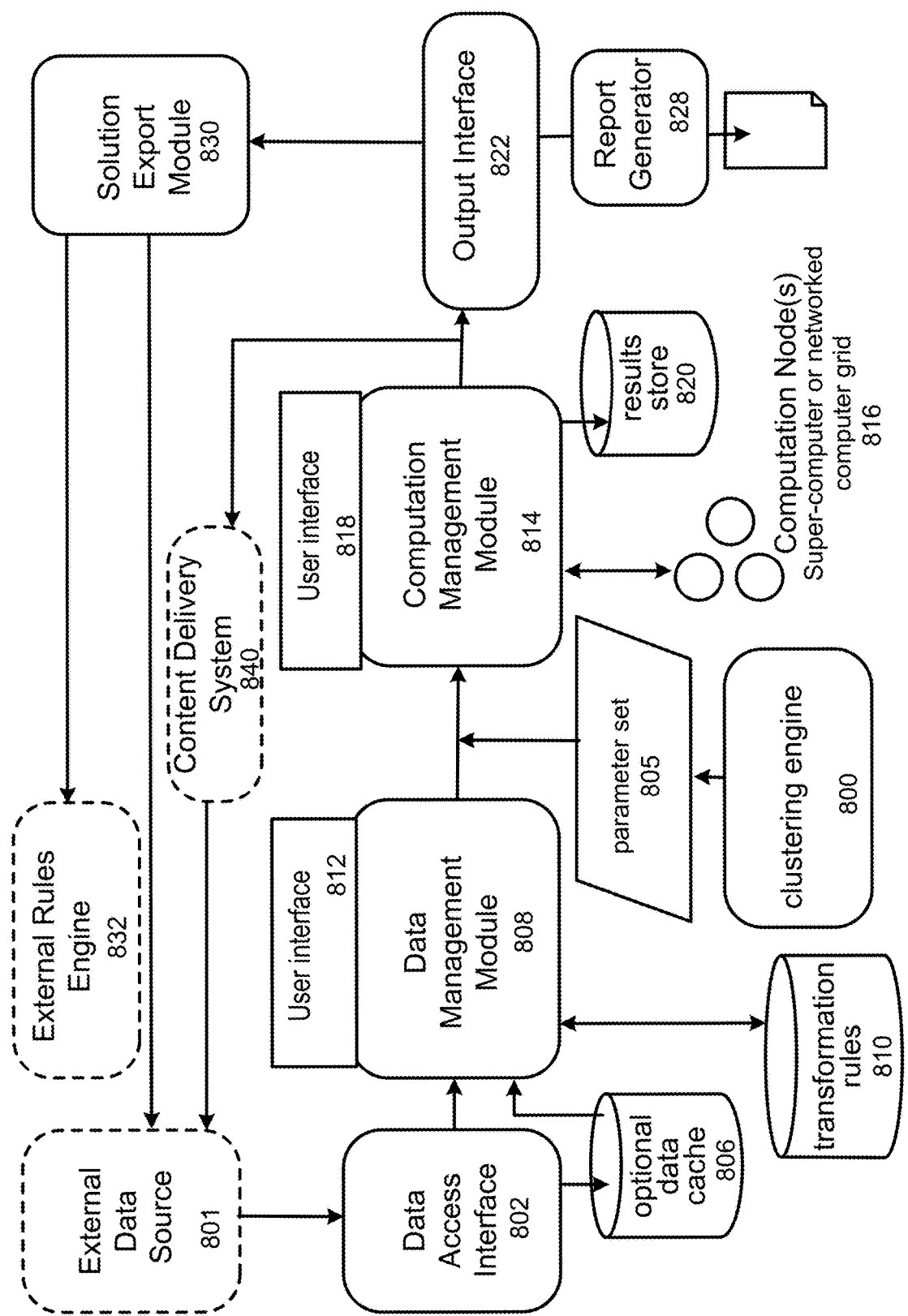

FIGS. 7-8 illustrate a clustering system and process, according to an example. FIG. 7 may provide a clustering process that uses a technique based on segmentation for modeling. Data (individual or segmented) may be received and segmentation overlays may be provided. This may include using initial anonymized segmentation from a data source, such as Experian, or other data source. Overlay needs, social and balance sheet attributes, etc. may be used to create "microsegments." These microsegments may be finalized into multiple iterations or grouped together into similar microsegments based on validating segment profiles, sizes, or other factors. The combination of these attributes, as well as others, may help define the microsegment, which in turn may be used to help make predictions.

For example, in customer split in segments, identification of homogeneous groups may be provided. Each segment's customer analysis may also be based on such attributes. Models may also be developed based on similar groups of customers. Therefore, FWBI may be tailored to customer and segment. Use of Bayesian Hierarchical clustering and/or K-means cluster, as well as other techniques, for example, may be performed by the clustering system depicted in FIG. 8, to develop the cluster results for machine learning.

FIG. 8 illustrates an example of components of a clustering system 800. The clustering system 800 in FIG. 8 may be implemented in a distributed manner across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the clustering system 800 may be implemented as a distributed computing platform that coordinates the search and discovery of high-value segmentation strategies in data sets with large numbers of variables.

In the example of FIG. 8, data may be accessed from a data source 801 by data access interface 802. The data access interface 804 may optionally store some or all (or none) of the data in a local data cache 806. The imported data may then be passed to a data management module 808 for processing prior to clustering. For example, the data management module 808 may organize the data by grouping, ordering, transforming, and/or "cleaning" the data in such a way that facilitates input of the data into clustering processes. The data management module 808 may use one or more transformation rules that specify one or more rules to apply to the data for processing. In some implementations, the transformation rules may be accessed from storage (e.g., from data store 810). Additionally or alternatively, the transformation rules may be input by a user. For example, the data management module 808 may provide a user interface 812 to a user that enables the user to specify one or more transformation rules.

The data management module 808 may identify different types of variables that are specified by the user, and separate the variables according to the identified type. Some types of variables may be used as inputs to the clustering process, while other types of variables may be used evaluation criteria to evaluate the resulting cluster solutions. As such, the system may enable not only automated clustering of data, but also automated evaluation of the resulting cluster solutions. For example, the system may separate variables in the data across three distinct types: Target Drivers, Cluster Candidates, and Profile Variables. Target Drivers may be factors that are for driving the success of a business, such as revenue, profitability, potential value of a customer, costs, etc. In some cases, there may be no more than two or three target drivers. Cluster Candidates may be attributes that are readily available that may be used to partition the overall population. These may describe the population and may be significantly different from the business drivers. Profile Variables may be other factors that are not assigned as cluster candidates or target drivers. Profile variables may not be immediately actionable (the data may not be easily accessible or may be found only after a period of lime) or they may be too much of a restatement of the business drivers.

The variables determined by the data management module 808 and the parameter set 805 generated by the clustering engine 800 may be provided to the computation management module 814. The computation management module 814 may send the processed data including parameter set 805 and one or more chosen clustering algorithms to one or more computational nodes 816 to perform clustering operations. The clustering operations may identify several (e.g., thousands or millions) different cluster solutions, each including a plurality of clusters of the data.

The computation management module 814 may evaluate generated cluster solutions based on user-specified criteria, and iterate through multiple sets of cluster solutions to identify cluster solutions that satisfy the criteria. The computation management module 814 may identify also apply one or more generalized heuristic supervised learning algorithms to the computation process to improve the efficiency of the solution search, based on the cluster solutions generated by the computational nodes 816. The supervised learning algorithms may utilize target driver variables specified by the user to facilitate searching for particular cluster solution(s), among the potentially many cluster solutions generated by the computation nodes 816, that are meaningful to the user. As an example, the heuristic optimization algorithm may be an adaptation of Simulated Annealing. The computation management module 814 may also provide a user interface 818 that shows the user the progress of the clustering and shows cluster solutions.

The computation management module 814 may also provide a user interface that shows the user the progress of the clustering and shows cluster solutions. The user interface may include an output interface 822 (e.g., visualization module) which shows cluster solution(s) and other information pertaining to the cluster solutions. A report generator 928 generates report regarding the cluster solutions.

In some implementations, the output interface 822 may also provide the cluster solution(s) and/or evaluation results to a solution export module 830. The solution export module 830 may then provide feedback information to the clustering system 800 or other systems. For example, the solution export module 830 may provide feedback information to an external rules engine 832, which may, for example, use the feedback information to adapt one or more transformation rules. Additionally or alternatively, the solution export module 830 may feedback information to the external data source 802, for example, to adjust one or more variables or attributes in the data.

For example, the solution export module 830 may be configured to export information regarding a cluster solution to different types of external databases and external systems, and facilitate the implementation of the cluster solution by the external systems. In some implementations, the solution export module 830 may be configured to export one or more rules or algorithms for clustering data, based on the cluster solution that was generated. The rules or algorithms may enable external systems to apply those rules or algorithms to implement the generated cluster solution to various types of data stored on the external database. In some implementations, the system may obtain data from the external system, retune the cluster solution based on the received data (such as changing variable selection), and send information regarding a revised cluster solution to the external system. As such, in some implementations, the clustering system 800 may enable more than just an analytics tool, but also enable a feedback-based and connected enterprise system.

The output interface 822 may then provide the resulting cluster solution(s) and results of the evaluation to a report generator 828, which in turn may generate a report to be output to the user. The report may include various types of information regarding the evaluation of the cluster solution(s), and may enable a user to adjust one or more variables of the clustering system 800 to fine-tune the clustering operations, and thereby provide supervised machine learning and predictive analysis.

In some implementations, the output interface 822 may also provide the cluster solution(s) and/or evaluation results to a solution export module 830. The solution export module 830 may then provide feedback information to the clustering system 800 or other systems. For example, the solution export module 830 may provide feedback information to an external rules engine 832, which may, for example, use the feedback information to adapt one or more transformation rules. Additionally or alternatively, the solution export module 830 may feedback information to the external data source 802, for example, to adjust one or more variables or attributes in the data.

For example, the solution export module 830 may be configured to export information regarding a cluster solution to different types of external databases and external systems, and facilitate the implementation of the cluster solution by the external systems. In some implementations, the solution export module 830 may be configured to export one or more rules or algorithms for clustering data, based on the cluster solution that was generated. The rules or algorithms may enable external systems to apply those rules or algorithms to implement the generated cluster solution to various types of data stored on the external database. In some implementations, the clustering system 800 may obtain data from the external system, retune the cluster solution based on the received data, and send information regarding a revised cluster solution to the external system. As such, in some implementations, the system may enable more than just an analytics tool, but also enable a feedback-based and connected machine learning and predictive analytics system for predicting life events in real-time or near-real-time, as described herein.

As a particular example, for a data set of 10,000 customers with voluminous data (e.g., from a customer survey, social media, etc.), the clustering system 800 may select some subset of variables from that data set (e.g. 5 variables) and generate a cluster solution that divides those 10,000 customers into 4 different groups. For example, these customers may be group by the "value" of customers. Another example may including grouping the customers by next potential life events. Other various groupings may be considered.

Now consider a scenario in which, after those 10,000 customers have been assigned to four clusters, the company may want to organize and cluster another 1 million customers into the four cluster groups. The system may be configured to export a solution, e.g., as a basic algorithm, that the company's computer systems may be able to use to assign new customer records to the four cluster groups. As illustrative examples, the exported solution may be in the form of a special SQL function that can be processed by the company's customer database, or a Hadoop Map-Reduce algorithm that can similarly be processed on the company's BigData Hadoop cluster, etc. In some implementations, the exported solution may enable the company to implement the cluster solution in a manner that is independent of system that generated the cluster solution, such that the company may easily implement the cluster solution locally within its own systems. In some implementations, the exported solution may only need as input the selected subset of variables (e.g., 5 variables in the example above) that were used in the cluster solution computation.

By providing a composite technique of cluster generation and cluster evaluation, the clustering system 800 may enable a user to analyze the details and nuances of many (e.g., dozens of) solutions at the same time, rather than individually analyzing one solution at a time to see if each solution is appropriate. The clustering system 800 may therefore enable a user to explore a large number (e.g., millions) of cluster solutions efficiently in less time than it would take a typical practitioner to evaluate fewer (e.g., a couple dozen) cluster solutions. This may be particularly useful in life event predictions and analysis, as described herein.

In an implementation, the system may include an external system, such as content delivery system 840, that is controlled based on a selected cluster solution. For example, instructions may be sent to the content delivery system 840 based on attributes determined for clusters in the selected cluster solution. In an example, attributes may be identified for a cluster that are associated with customers in a particular region, which may indicate that a life pattern associated with purchases exists that is particular to shoppers from that region. The computation management module 814 or another module not shown may send instructions to the content delivery system 840 to digitally send recommendations over a network to customers that fit a particular life event profile. In an example, the content delivery system 840 may include a contact resource management system, such as provided by Salesforce.com®, Infusionsoft®, Microsoft Dynamics®, etc., which automatically targets customers. For example, data in a database that is associated with customers in a particular cluster or grouping is queried and for each customer customized emails or recommendations are automatically sent. The content delivery system 840 may have the flexibility to send recommendations with a time-interval of hours, days, weeks, etc. and also has an option to trigger sending through the instructions. The external data source 802 may capture online behaviors of the targeted customers to determine whether the recommendations or other incentives are being used and to provide feedback for future clustering.

In some implementations, the user interfaces 812, 818, and 822 may be custom-designed user interfaces that facilitate some portion of the overall activity and, in some cases, may be used by multiple users with different roles. As such a clustering and evaluation system 800 according to the present disclosure may coordinate and facilitate a distributed process of cluster generation and evaluation, and streamline the tasks and roles that potentially involve the participation of multiple people.

Figure 9A:
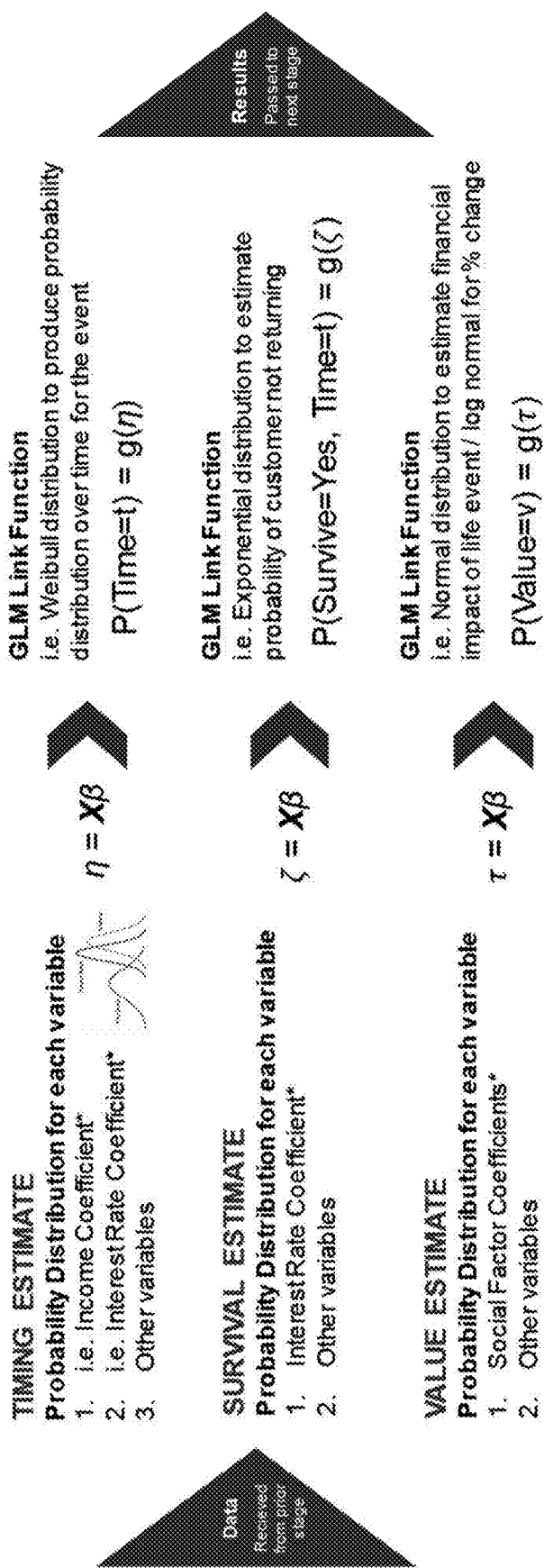
FIGS. 9A-9B illustrates life event prediction analytics, according to an example.
Figure 9B:
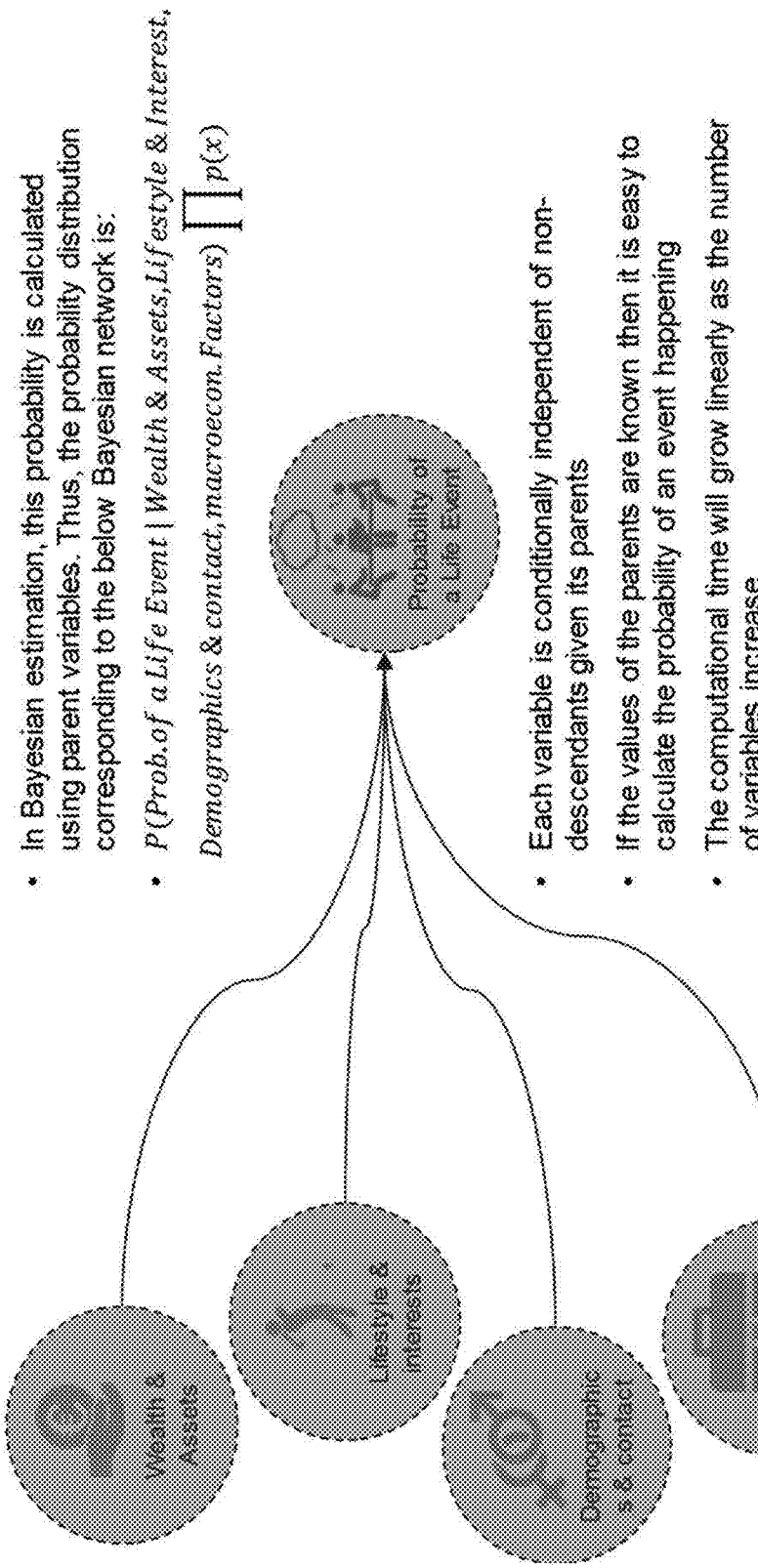

FIGS. 9A-9B illustrates life event prediction analytics, according to an example. Machine learning may be used to produce various models. These may include models that time life events, predict probability of a life event, predict the financial size of the event, etc. These models may then be used to estimate life events for a given customer. FIG. 9A represents that various models that may be provided. As shown, predictive analytics may include a timing estimate, survival estimate, and a value estimate. These estimates may be based on probability distributions (e.g., Weibull or otherwise) to help predict when a particular event may occur, a survival window, and a value or financial impact of the predicted life event.

FIG. 9B illustrates an alternative example where a Bayesian estimation may be used to determine probability using parent variables. As shown, each variable may be conditional and may depend on a host of other variables. More specifically, in a Bayesian estimation, probability of the life event may be calculated using parent variables. The probability distribution may correspond to the Bayesian network, as shown. Here, each variable may be conditionally independent on non-descendants given its parents. And if the values of parents are known, then it may not be too difficult to calculate probability of an event happening. It should be appreciated that computational time may grow linearly as number of variables increase. In this case, the wealth and assets, lifestyle and interests, demographics and contact, and macroeconomic factors may be used by machine learning models to determine and predict probability of a life event.

Figure 10:
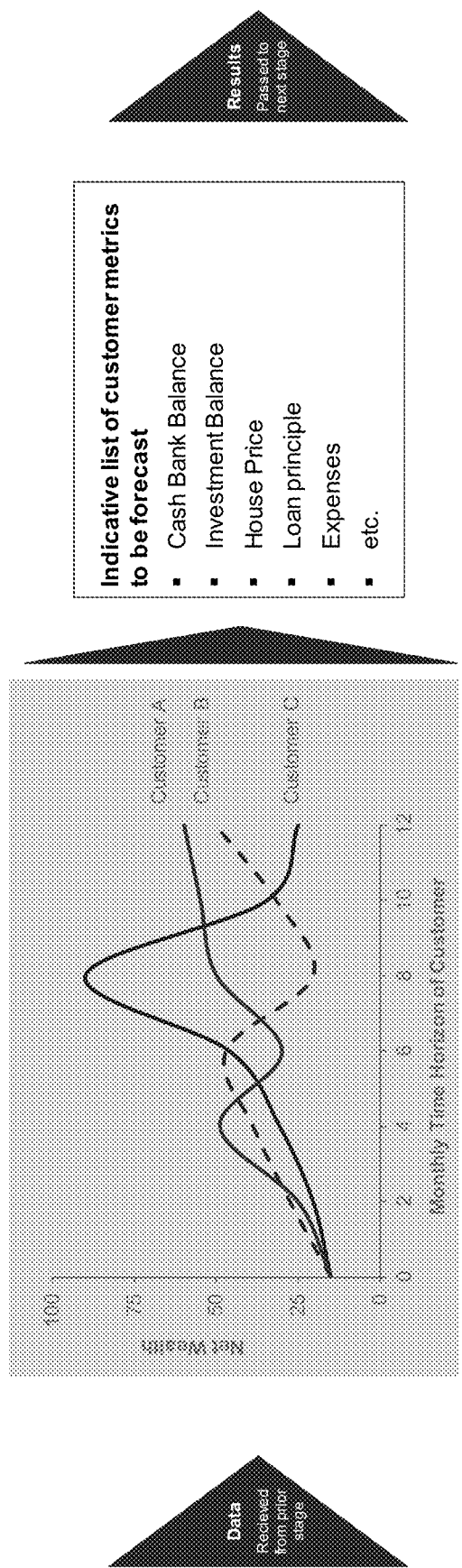
FIG. 10 illustrates financial forecasting analytics, according to an example.

FIG. 10 illustrates financial forecasting analytics, according to an example. Numerous forecasts of key financial metrics over a 12-24 month horizon may be generated. These simulations may be operated in real-time or near real-time and provide a list of customer metrics to be forecast, such as cash bank advance, investment balance, house price, loan principle, expenses, and other financially-related metrics associated with life events or life change.

FIG. 11 illustrates ratio calculation and indexing analytics, according to an example. Financial ratios may be used to analyze customer financial future across range of metrics. For example, these ratios may be weighed according to various financial institution or cluster risk profiles to create a financial well-being index (FWBI). In an example, the following ratios may be calculated: liabilities, assets, disposable income, net assets, interest coverage, asset coverage, net cash flow/debt, due liabilities, cash available, luxury, total spending, income stability, total savings, expenditure, total pension, property value, etc. For financial well-being index (FWBI), these may include liabilities, assets, disposable income, interest, coverage, income stability, luxury, total spend, etc.

Figure 12:
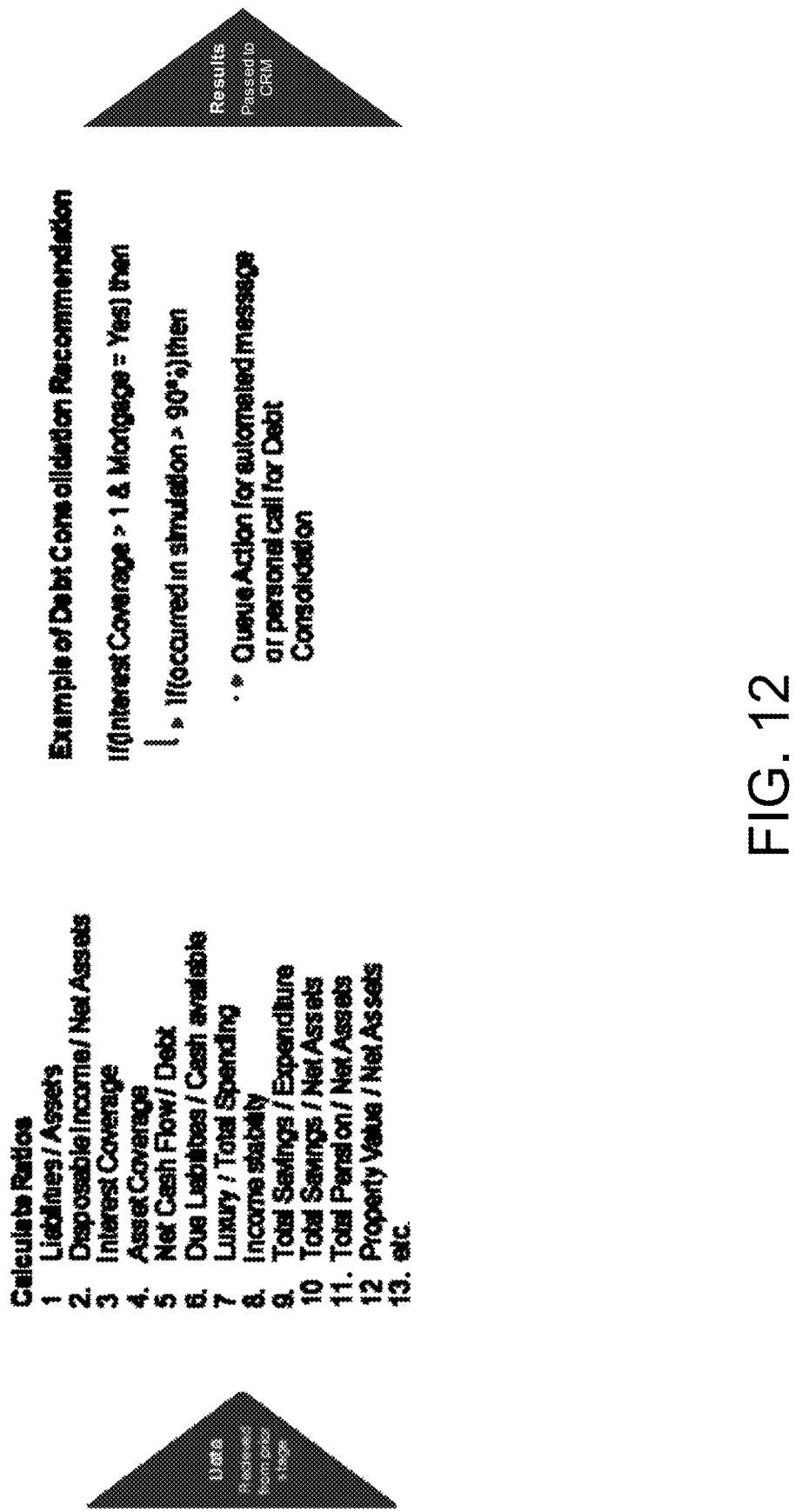
FIG. 12 illustrates a recommendations engine and system, according to an example.

FIG. 12 illustrates a recommendations engine and system, according to an example. Based on machine learning and predictive analysis provided herein, recommendations may be generated, issued, and/or reported using at least the calculated ratios from FIG. 11. These may include re-defined rules to trigger and send to a customer, for example, debt consolidation guidance, other recommendation based on the life event determination and predictions. In an example, if a debt consolidation recommendation is generated, the system may queue an action for an automated message or personal call with a customer. Other various actions or operations may also be provided.

Figure 13B:
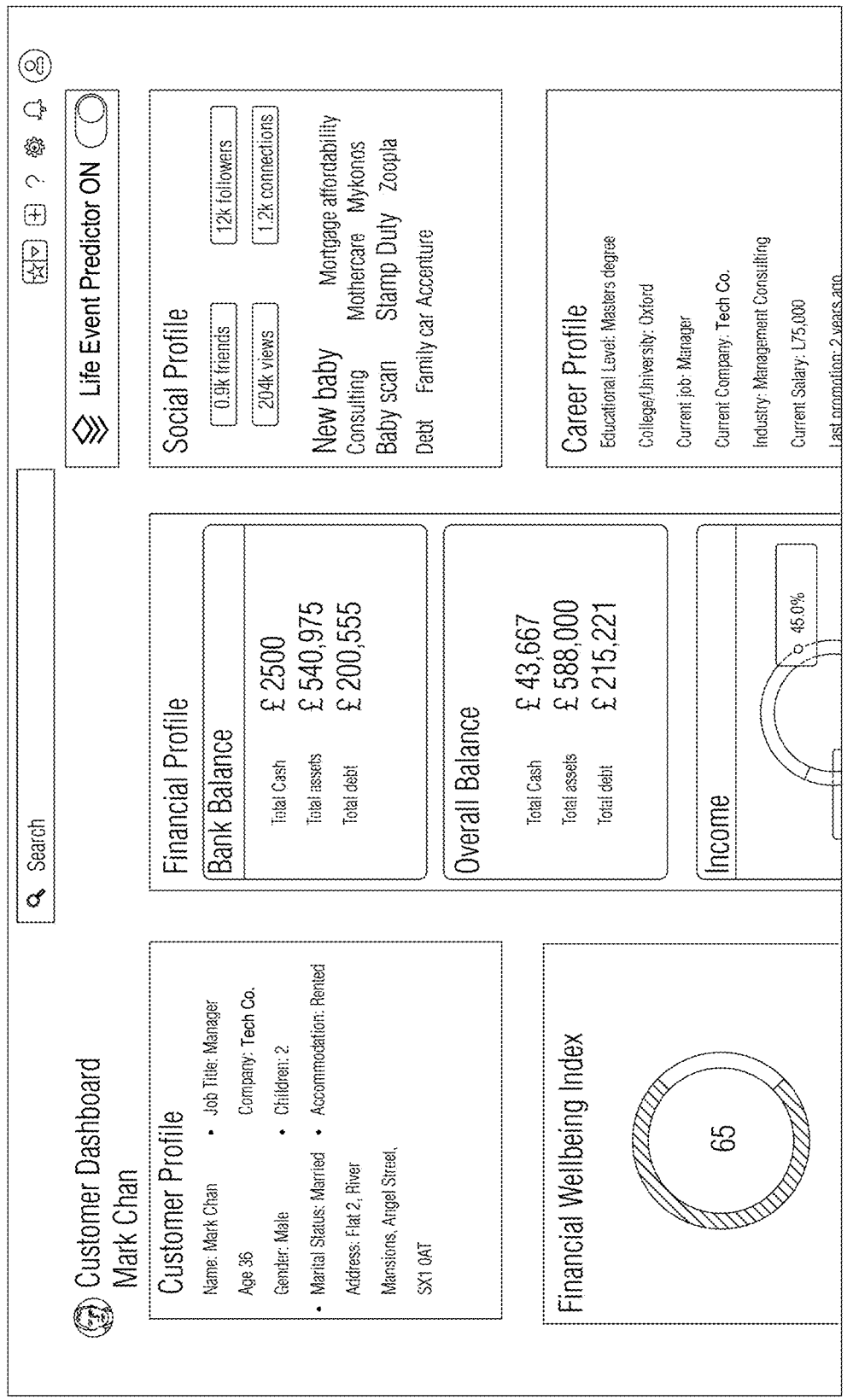
Figure 13C:
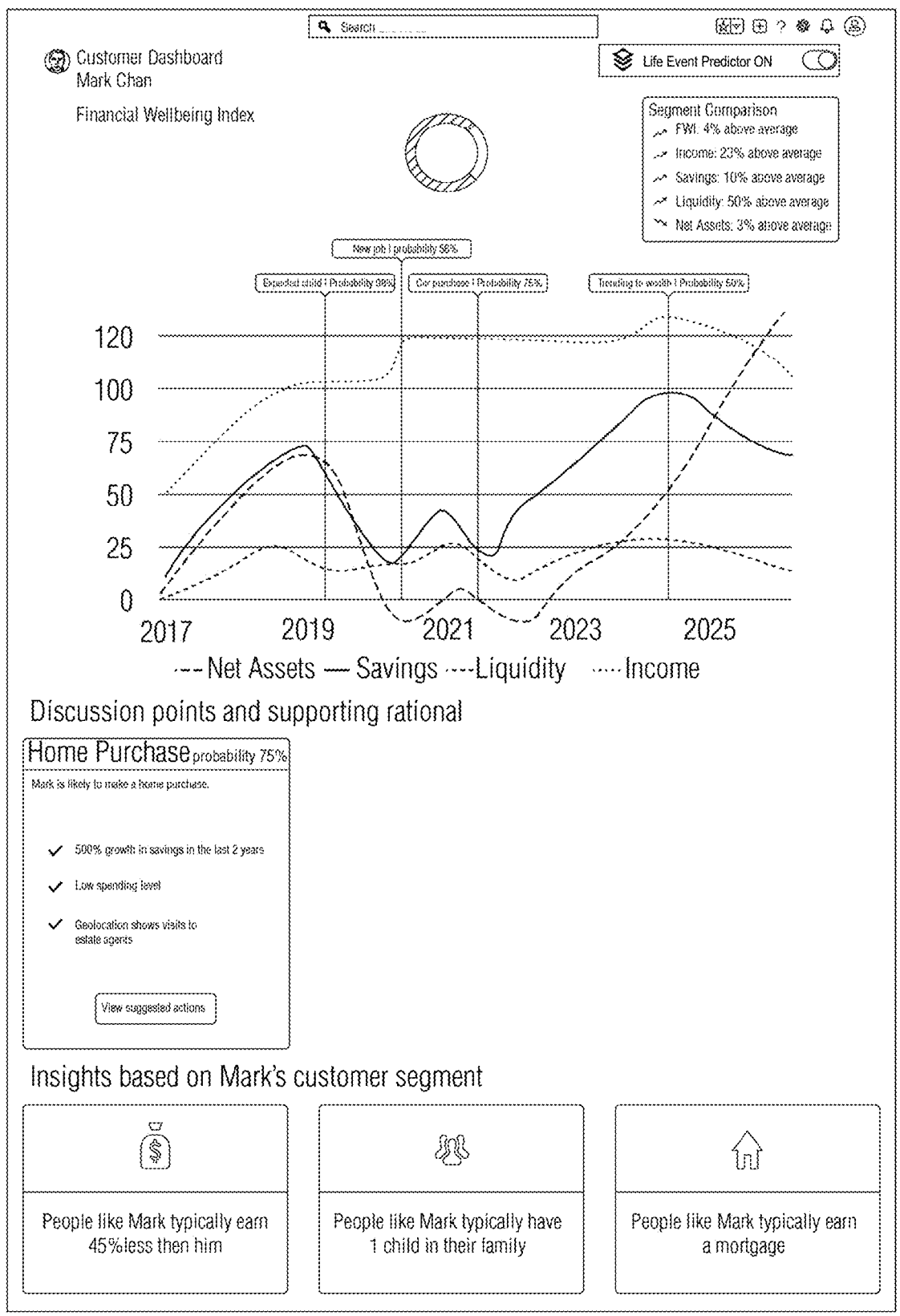

FIGS. 13A-13C illustrate various screens of a dashboard for life event prediction based on machine learning and predictive analytics, according to an example. FIG. 13A illustrates a screen of a dashboard for life event prediction based on machine learning and predictive analytics, according to an example. This screen may be accessed and viewed by a customer service representative of a financial institution. As shown, the dashboard may present "Today's Tasks," which may include requests to generate "new customer insights" for Mark Chan and Alice Brown. This action may include checking on the status of either Mark Chan or Alice Brown to see if there are any life events coming up, for which financial products or services may be offered. The customer service representative may also elect to check on the status of other customers or account holders.

FIG. 13B illustrates a screen of a dashboard for life event prediction based on machine learning and predictive analytics, according to an example. In this screen, the customer service representative may have elected to check on the status of Mark Chan. The dashboard may present a variety of information associated with this customer. For example, a customer profile, a financial profile, a social profile, and a career profile of Mark Chan may be presented. The customer profile may present the customer's personal information, such as name, age, date of birth, title, employer, marital status, address, etc. The financial profile may present the customer's cash balance, assets, income, spending activities, spending habits/trends, etc. The social profile may be linked to the customer's social media presence and provide a snapshot of trending posts, topics, likes, links, friends, connections, location, travels, etc. It should be appreciated that if a "Life Even Prediction" option is activated (as shown), a financial well-being Index (FWBI) may also be presented for the customer representative to view. The financial well-being Index (FWBI) may include various life event prediction views for the customer representative, and other related information.

For example, FIG. 13C illustrates a screen of a dashboard for life event prediction based on machine learning and predictive analytics, according to an example. If the customer service representative desires to see Mark Chan's financial well-being Index (FWBI), this screen may be presented. Based on all the received data and information for Mark Chan, a graph may be show to indicate where Mark is in his life. Line graphs may depict trends and probability of various life events, such as expectation of child (98% probability), new job probability (56%), car purchase probability (75%), and wealth trend probability (50%). At the bottom of the screen, a summary or recommendation may be provided to the customer service representative. In an example, the recommendation may be based on a prediction that Mark is 75% likely to purchase a home in the next few months. As a result, the recommendation is advising the customer service representative to reach out to Mark with relevant services or products to help the customer with this next important life event. Using the systems, techniques, and examples described herein, an intuitive machine learning and predictive analytics system may provide customers with optimum and timely services and products.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

The invention claimed is:

1. A system, comprising:
one or more data stores to store and manage data within a network;
one or more servers to facilitate operations using information from the one or more data stores; and
a processing system using machine learning and predictive analytics, the processing system comprising:
a data access interface to receive data associated with a subject, wherein the data is received from a data source comprising an internal data source and an external data source, wherein the internal data source comprises a financial database of a financial institution associated with the subject, and the external data source comprises a public database and a web feed associated with the subject; and
a processor to execute machine-readable instructions stored on at least one non-transitory computer readable medium, the processor to:
analyze the data associated with the subject to predict a future life event using a clustering technique comprising at least one of agglomerative hierarchical clustering, Bayesian hierarchical clustering, K-means clustering, mean-shift clustering, density-based spatial clustering of applications with noise (DBSCAN), expectation-maximization (EM) based clustering, Gaussian Mixture Model (GMM) based clustering;
calculate at least one of a financial forecast, a ratio, and an index based on the predicted future life event and data associated with the subject, wherein calculating the at least one of a financial forecast, a ratio, and an index comprises using at least one of a machine learning technique, statistical analysis technique, a simulation technique, and a modeling technique, and wherein the at least one of a financial forecast, a ratio, and an index represents a likelihood of the subject taking a financial action with a financial institution; and
generate a recommendation based on the at least one of the financial forecast, the ratio, and the index, wherein the recommendation comprises at least the financial action for the subject to take based on the predicted life event; and
an output interface to transmit the recommendation to at least one of a user at a financial institution, the subject, and the processing system for continuous machine learning, statistical analysis, simulation, or modeling.

2. The system of claim 1, wherein the data source comprises at least one of an enterprise resource planning (ERP) system, a document, a web feed, a sensor, a geolocation data source, an enterprise database, a financial database, a private database, a public database, a server, an analytics tool, a mobile device, an external social media source, and a reporting system.

3. The system of claim 1, wherein the public database comprises population data and is associated with a census database, and the web feed comprises data from social media, RSS, syndication, aggregators, and web scraping.

4. The system of claim 1, wherein at least one of a financial forecast, ratio, and an index is calculated based on financial data of a financial institution and based on external social media data.

5. The system of claim 1, wherein the future life event comprises at least one of purchasing a car, getting married, having a child, purchasing a home, children starting school or college, getting a divorce, relocation, retirement, death of a loved one, and change in employment or career.

6. The system of claim 1, wherein the financial forecast is based on a Monte Carlo simulation for stress testing.

7. The system of claim 1, wherein the financial action comprises applying for, requesting information related to, or securing at least one of a loan, a mortgage, a credit card, a line of credit, banking options, crowdfunding, financial savings, investment options, and financial planning services.

8. The system of claim 1, wherein the recommendation is transmitted via at least one of an automated communication, an email, a textual message, an audio communication, a visual message, a personal call, and a report.

9. A system, comprising:
a data access interface to receive data associated with a subject over a network, wherein the data is received from data source comprising at least one of an internal data source and an external data source, wherein the internal data source comprises a financial database of a financial institution associated with the subject, and the external data source comprises a public database and a web feed associated with the subject, wherein the public database comprises population data and is associated with a census database, and the web feed comprises data from social media, RSS, syndication, aggregators, and web scraping; and
a processor to execute machine-readable instructions stored on at least one non-transitory computer readable medium, the processor to:
analyze the data associated with the subject based on a clustering technique comprising at least one of agglomerative hierarchical clustering, Bayesian hierarchical clustering, K-means clustering, mean-shift clustering, density-based spatial clustering of applications with noise (DBSCAN), expectation-maximization (EM) based clustering, Gaussian Mixture Model (GMM) based clustering;
predict a future life event based on the analyzed data, wherein the future life event comprises at least one of purchasing a car, getting married, having a child, purchasing a home, children starting school or college, getting a divorce, relocation, retirement, death of a loved one, and change in employment or career;
calculate at least one of a financial forecast, a ratio, and an index based on the predicted future life event and data associated with the subject, wherein the at least one of a financial forecast, a ratio, and an index is calculated using at least one of a machine learning technique, statistical analysis technique, a simulation technique, and a modeling technique, and wherein the at least one of a financial forecast, a ratio, and an index represents a likelihood of the subject taking a financial action with a financial institution; and
generate a recommendation based on the at least one of the financial forecast, the ratio, and the index, wherein the recommendation comprises at least the financial action for the subject to take based on the predicted life event, wherein the financial action comprises applying for, requesting information related to, or securing at least one of a loan, a mortgage, a credit card, a line of credit, banking options, crowdfunding, financial savings, investment options, and financial planning services; and
an output interface to transmit the recommendation to at least one of a user at a financial institution, the subject, and the machine learning and predictive analytics system for continuous machine learning, statistical analysis, simulation, or modeling.

10. The system of claim 9, wherein the recommendation is transmitted via at least one of an automated communication, an email, a textual message, an audio communication, a visual message, a personal call, and a report.

11. A method, comprising:
receiving, at a data access interface, data associated with a subject over a network, wherein the data is received from data source comprising at least one of an internal data source and an external data source, wherein the internal data source comprises a financial database of a financial institution associated with the subject, and the external data source comprises a public database and a web feed associated with the subject;
analyzing, by a processor, the data associated with the subject using a clustering technique comprising at least one of agglomerative hierarchical clustering, Bayesian hierarchical clustering, K-means clustering, mean-shift clustering, density-based spatial clustering of applications with noise (DBSCAN), expectation-maximization (EM) based clustering, Gaussian Mixture Model (GMM) based clustering;
predicting a future life event based on the analyzed data;
calculating at least one of a financial forecast, a ratio, and an index based on the predicted future life event and data associated with the subject, wherein calculating at least one of a financial forecast, a ratio, and an index comprises using at least one of a machine learning technique, statistical analysis technique, a simulation technique, and a modeling technique, and wherein the at least one of a financial forecast, a ratio, and an index represents a likelihood of the subject taking a financial action with a financial institution; and
generating a recommendation based on the at least one of the financial forecast, the ratio, and the index, wherein the recommendation comprises at least the financial action for the subject to take based on the predicted life event.

12. The method of claim 11, further comprising:
transmitting, by an output interface, the recommendation to at least one of a user at a financial institution, the subject, and a machine learning and predictive analytics system for continuous machine learning, statistical analysis, simulation, or modeling.

13. The method of claim 11, wherein the future life event comprises at least one of purchasing a car, getting married, having a child, purchasing a home, children starting school or college, getting a divorce, relocation, retirement, death of a loved one, and change in employment or career.

14. The method of claim 11, wherein the financial action comprises applying for, requesting information related to, or securing at least one of a loan, a mortgage, a credit card, a line of credit, banking options, crowdfunding, financial savings, investment options, and financial planning services.

15. A non-transitory computer-readable storage medium having an executable stored thereon, which when executed instructs a processor to perform the following:
receiving data associated with a subject over a network, wherein the data is received from data source comprising at least one of an internal data source and an external data source, wherein the internal data source comprises a financial database of a financial institution associated with the subject, and the external data source comprises a public database and a web feed associated with the subject;
analyzing, by a processor, the data associated with the subject using a clustering technique comprising at least one of agglomerative hierarchical clustering, Bayesian hierarchical clustering, K-means clustering, mean-shift clustering, density-based spatial clustering of applications with noise (DBSCAN), expectation-maximization (EM) based clustering, Gaussian Mixture Model (GMM) based clustering;
predicting a future life event based on the analyzed data;
calculating at least one of a financial forecast, a ratio, and an index based on the predicted future life event and data associated with the subject, wherein calculating at least one of a financial forecast, a ratio, and an index comprises using at least one of a machine learning technique, statistical analysis technique, a simulation technique, and a modeling technique, and wherein the at least one of a financial forecast, a ratio, and an index represents a likelihood of the subject taking a financial action with a financial institution; and
generating a recommendation based on the at least one of the financial forecast, the ratio, and the index, wherein the recommendation comprises at least the financial action for the subject to take based on the predicted life event.

* * * * *